(12) United States Patent
Das et al.

(10) Patent No.: US 8,730,928 B2
(45) Date of Patent: May 20, 2014

(54) ENHANCEMENTS FOR INCREASED SPATIAL REUSE IN AD-HOC NETWORKS

(75) Inventors: Soumya Das, San Diego, CA (US); Krishnan Rajamani, San Diego, CA (US); Xiaolong Huang, San Diego, CA (US); Dilip Krishnaswamy, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 637 days.

(21) Appl. No.: 12/710,881

(22) Filed: Feb. 23, 2010

(65) Prior Publication Data

US 2011/0205962 A1    Aug. 25, 2011

(51) Int. Cl.
| | |
|---|---|
| *H04W 4/00* | (2009.01) |
| *H04W 16/28* | (2009.01) |
| *H04W 8/00* | (2009.01) |
| *H04W 92/04* | (2009.01) |
| *H04W 92/16* | (2009.01) |

(52) U.S. Cl.
CPC .............. *H04W 16/28* (2013.01); *H04W 8/005* (2013.01); *H04W 92/04* (2013.01); *H04W 92/16* (2013.01)
USPC ........................... 370/338; 370/254; 370/401

(58) Field of Classification Search
None
See application file for complete search history.

(56) References Cited

U.S. PATENT DOCUMENTS

| | | | |
|---|---|---|---|
| 6,604,140 B1 | 8/2003 | Beck et al. | |
| 6,633,757 B1 | 10/2003 | Hermann et al. | |
| 6,909,721 B2 | 6/2005 | Ekberg et al. | |
| 7,293,080 B1 | 11/2007 | Clemm et al. | |
| 7,379,958 B2 | 5/2008 | Karhu | |
| 7,386,459 B2 | 6/2008 | English | |
| 7,440,994 B2 | 10/2008 | Harrow et al. | |
| 7,457,304 B2 | 11/2008 | Roh et al. | |
| 7,477,634 B1 | 1/2009 | McKown | |

(Continued)

FOREIGN PATENT DOCUMENTS

| | | |
|---|---|---|
| CN | 1627760 A | 6/2005 |
| CN | 101341685 A | 1/2009 |

(Continued)

OTHER PUBLICATIONS

Wei Kuang Lai,"MARS: a multiple access scheme with sender driven and reception first for smart antenna in ad hoc networks", Wireless Communications and Mobile Computing, Wirel. Commun. Mob. Comput. 2009, 9:197-208, Published online Apr. 21, 2008 in Wiley InterScience.

(Continued)

*Primary Examiner* — Bob Phunkulh
(74) *Attorney, Agent, or Firm* — QUALCOMM IP Department; James Hunt Yancey, Jr.

(57) ABSTRACT

A method of facilitating communication in a wireless ad-hoc network comprises: generating, at a node in the wireless ad-hoc network, target availability information with regard to one or more transmission slots, the target availability information indicating whether the node is permitted to receive a transmission during each transmission slot; generating, at the node, owner availability information with regard to one or more transmission slots, the owner availability information indicating whether the node is permitted to transmit during each transmission slot; and broadcasting, from the node, the target availability information and the owner availability information to separately indicate availability as either an owner or a target for one or more transmission slots.

44 Claims, 10 Drawing Sheets

(56) References Cited

U.S. PATENT DOCUMENTS

| | | | |
|---|---|---|---|
| 7,492,777 B2 | 2/2009 | Ekberg et al. | |
| 7,499,981 B2 | 3/2009 | Harrow et al. | |
| 7,516,201 B2 | 4/2009 | Kovacs et al. | |
| 7,546,363 B2 | 6/2009 | Harrow et al. | |
| 7,562,112 B2 | 7/2009 | Harrow et al. | |
| 7,590,097 B2 | 9/2009 | Ekberg et al. | |
| 7,631,033 B2 | 12/2009 | Zehler | |
| 7,647,012 B2 | 1/2010 | Yamada et al. | |
| 7,647,021 B2 | 1/2010 | Moore et al. | |
| 7,656,822 B1 | 2/2010 | Abdelaziz et al. | |
| 7,714,911 B2 | 5/2010 | Yoshida | |
| 7,734,717 B2 | 6/2010 | Saarimaki et al. | |
| 7,769,837 B2 | 8/2010 | Nogawa et al. | |
| 7,844,738 B2 | 11/2010 | Eytchison | |
| 7,904,561 B2 | 3/2011 | Chan et al. | |
| 7,921,155 B2 | 4/2011 | Harrow et al. | |
| 2004/0162871 A1 | 8/2004 | Pabla et al. | |
| 2006/0178924 A1 | 8/2006 | Yagiura | |
| 2006/0235958 A1 | 10/2006 | Motoyama | |
| 2007/0060160 A1 | 3/2007 | Hur et al. | |
| 2007/0116031 A1 | 5/2007 | Chung et al. | |
| 2007/0141986 A1 | 6/2007 | Kuehnel et al. | |
| 2007/0153717 A1 | 7/2007 | Tervonen et al. | |
| 2007/0189322 A1 | 8/2007 | Hirose | |
| 2007/0192300 A1 | 8/2007 | Reuther et al. | |
| 2007/0195746 A1 | 8/2007 | Ryu et al. | |
| 2007/0283018 A1 | 12/2007 | Yun | |
| 2008/0123558 A1 | 5/2008 | Chhabra | |
| 2008/0139116 A1 | 6/2008 | Balgard et al. | |
| 2008/0140835 A1 | 6/2008 | Bradley et al. | |
| 2008/0248802 A1* | 10/2008 | Krishnamoorthy | 455/445 |
| 2008/0250160 A1* | 10/2008 | Hall | 710/3 |
| 2008/0298329 A1* | 12/2008 | Mo et al. | 370/338 |
| 2009/0029691 A1 | 1/2009 | Shen et al. | |
| 2009/0029699 A1 | 1/2009 | Luukkala et al. | |
| 2009/0031035 A1 | 1/2009 | Dharmaraju et al. | |
| 2009/0036063 A1* | 2/2009 | Zuniga et al. | 455/73 |
| 2009/0059890 A1 | 3/2009 | Cordeiro et al. | |
| 2009/0061784 A1 | 3/2009 | Cordeiro | |
| 2009/0092105 A1* | 4/2009 | Chou | 370/337 |
| 2009/0103568 A1 | 4/2009 | Garba et al. | |
| 2009/0106810 A1* | 4/2009 | Stoye et al. | 725/131 |
| 2009/0157829 A1 | 6/2009 | Choi et al. | |
| 2009/0213771 A1* | 8/2009 | Celentano et al. | 370/310 |
| 2009/0219947 A1* | 9/2009 | Kariya | 370/462 |
| 2009/0237265 A1 | 9/2009 | Eguchi | |
| 2009/0274166 A1* | 11/2009 | Zhang et al. | 370/443 |
| 2009/0290528 A1* | 11/2009 | Kwon et al. | 370/315 |
| 2010/0054223 A1* | 3/2010 | Zhang et al. | 370/338 |
| 2010/0085916 A1 | 4/2010 | Yu et al. | |
| 2010/0097946 A1* | 4/2010 | Celentano et al. | 370/252 |
| 2010/0118785 A1* | 5/2010 | Sugaya | 370/328 |
| 2010/0165925 A1* | 7/2010 | Del Prado Pavon et al. | 370/329 |
| 2010/0260042 A1* | 10/2010 | Kwon et al. | 370/227 |
| 2011/0044280 A1* | 2/2011 | Zhai | 370/329 |
| 2011/0055326 A1 | 3/2011 | Michaelis et al. | |
| 2011/0069187 A1 | 3/2011 | Yokota | |
| 2011/0106837 A1 | 5/2011 | Walton et al. | |
| 2011/0113085 A1 | 5/2011 | Manor et al. | |
| 2012/0033585 A1 | 2/2012 | Michaelis et al. | |
| 2013/0281086 A1 | 10/2013 | Michaelis | |
| 2013/0281146 A1 | 10/2013 | Walton | |

FOREIGN PATENT DOCUMENTS

| | | |
|---|---|---|
| EP | 1542409 A1 | 6/2005 |
| EP | 1677462 A1 | 7/2006 |
| EP | 1592177 B1 | 4/2007 |
| JP | 2003284139 A | 10/2003 |
| JP | 2005086570 A | 3/2005 |
| JP | 2005167696 A | 6/2005 |
| JP | 2005318581 A | 11/2005 |
| JP | 2006013811 A | 1/2006 |
| JP | 2006171917 A | 6/2006 |
| JP | 2006237658 | 9/2006 |
| JP | 2007180839 A | 7/2007 |
| JP | 2007234008 A | 9/2007 |
| JP | 2009055246 A | 3/2009 |
| JP | 2009055350 A | 3/2009 |
| JP | 2009105750 A | 5/2009 |
| JP | 2009521190 A | 5/2009 |
| JP | 2009232259 A | 10/2009 |
| JP | 2009537898 A | 10/2009 |
| JP | 2010534980 A | 11/2010 |
| JP | 2010537699 A | 12/2010 |
| JP | 2011512102 A | 4/2011 |
| JP | 2011521583 A | 7/2011 |
| KR | 20040083238 A | 10/2004 |
| KR | 20050108087 A | 11/2005 |
| KR | 20090063732 A | 6/2009 |
| TW | 527791 B | 4/2003 |
| WO | WO-2007075961 A2 | 7/2007 |
| WO | WO2007136622 A2 | 11/2007 |
| WO | 2009015322 A2 | 1/2009 |

OTHER PUBLICATIONS

Zhensheng Zhang, "Pure Directional Transmission and Reception Algorithms in Wireless Ad Hoc Networks with Directional Antennas," 2005 IEEE International Conference on Communications, May 16-20, 2005, Seoul, Korea.

Gunther Auer, "Contention Free Dynamic Slot Allocation in Cellular Networks," Sarnoff Symposium 2009.

Campo C et al: "PDP: A lightweight discovery protocol for local-scope interactions in wireless ad hoc networks", Computer Networks, Elsevier Science Publishers B.V., Amsterdam, NL, vol. 50, No. 17, Dec. 5, 2006, pp. 3264-3283, XP025182668, ISSN: 1389-1286, DOI: DOI:10.1016/J.Comnet.2005.12.007 [retrieved on Dec. 5, 2006].

Chakraborty D et al: "Toward Distributed Service Discovery in Pervasive Computing Environments", IEEE Transactions on Mobile Computing, IEEE Service Center, Los Alamitos, CA, US LNKD-DOI:10.1109/TMC.2006.26, vol. 5, No. 2, Feb. 1, 2006, pp. 97-112, XP001545958, ISSN: 1536-1233.

Clausen T, et al., "Optimized Link State Routing Protocol", IETF draft, Oct. 2003.

ECMA International: "Standard ECMA-368 High Rate Ultra Wideband PHY and MAC Standard 2nd edition"Internet Citation Dec. 1, 2007, pp. I-VIII,1, XP002563778 Retrieved from the Internet:URL:http://www.ecmainternational.org/publications/files/ECMA-ST/ECMA-368%202nd%20edition%20December%202007.pdf [retrieved on Jan. 18, 2010].

Fan et al: "Bandwidth allocation in UWB WPANs with ECMA-368 MAC", Computer Communications, Elsevier Science Publishers BV, Amsterdam, NL, vol. 32, No. 5, Mar. 27, 2009, pp. 954-960, XP026001994, ISSN: 0140-3664, DOI: DOI:10.1016/J.COMCOM. 2008.12.024 [retrieved on Dec. 30, 2008] abstract section 2. Proposed MAS allocation method.

Guttman C Perkins J Kempf Sun Microsystems E: "Service Templates and Service: Schemes; rfc2609.txt", IETF Standard, Internet Engineering Task Force, IETF, CH, Jun. 1, 1999, XP015008392, ISSN: 0000-0003.

International Search Report and Written Opinion—PCT/US2011/025939, ISA/EPO—Jul. 14, 2011.

Partial International Search Report—PCT/US2011/025939—International Search Authority, European Patent Office, Jun. 6, 2011.

Sud S, et al., "Enabling rapid wireless system composition through layer-discovery", IEEE Network, IEEE Service Center, New York, NY, US, vol. 22, No. 4, Jul. 1, 2008, pp. 14-20, XP011232023,ISSN, 0890-8044, DOI, DOI,10.1109/MNET.2008.4579766 abstract p. 16, left-hand col., paragraph 1-right-hand col., paragraph 1 p. 18, right-hand col., paragraph 3-6.-

(56) References Cited

OTHER PUBLICATIONS

Ververidis C N, et al., "Service discovery for mobile Ad Hoc networks, a survey of issues and techniques", IEEE Communications Surveys, IEEE, New York, NY, US, vol. 10, No. 3, Jul. 1, 2008, pp. 30-45, XP011234560, ISSN, 1553-877X, DOI, DOI,10.1109/ COMST.2008.4625803 p. 34, left-hand col., paragraph 4-p. 36, left-hand col., paragraph 2.

European Search Report—EP12197707—Search Authority—Munich—Mar. 14, 2013.

\* cited by examiner

ENHANCEMENTS FOR INCREASED SPATIAL REUSE IN AD-HOC NETWORKS

FIELD OF DISCLOSURE

The present disclosure is directed to ad-hoc networks, and more particularly, to enhancements for increasing spatial reuse in wireless ad-hoc networks.

BACKGROUND

Wireless ad-hoc networks are decentralized wireless networks formed when a number of wireless communication devices, often referred to as nodes, decide to join together to form a network. Since nodes in wireless ad-hoc networks can operate as both hosts and routers, the network is easily reconfigured to meet existing traffic demands in a more efficient fashion than centrally managed wireless access networks. Moreover, wireless ad-hoc networks do not require the infrastructure required by these conventional access networks, making wireless ad-hoc networks an attractive alternative.

FIG. 1 illustrates an example wireless ad-hoc network 100 formed by a plurality of nodes 120 labeled A-H. As shown, each node 120 has an associated transmission range and is able to directly communicate with one or more other nodes 120 in the wireless ad-hoc network 100. Each node 120 may be stationary or in motion, such as a terminal that is being carried by a user on foot or in a vehicle, aircraft, ship, etc., and may be one of variety of communications devices including cellular, wireless or landline phones, personal data assistants (PDA), laptops, external or internal modems, PC cards, and any other similar device. The wireless ad-hoc network 100 may operate by itself, or may also be connected with an outside network 130 (e.g., the Internet) via one or more nodes (e.g., nodes A and C in FIG. 1).

Ultra-Wideband (UWB) is an example of communications technology (e.g., Multiband OFDM based UWB, ECMA-368, Impulse UWB, etc.) that may be implemented with wireless ad-hoc networks. UWB provides high speed communications over an extremely wide bandwidth. At the same time, UWB signals are typically transmitted in very short pulses that consume very little power. The output power of the UWB signal can be made low enough to look like noise to other RF technologies, making it less interfering.

A major challenge in wireless ad-hoc networks, including UWB networks, is the increased occurrence of hidden and/or exposed nodes. Hidden nodes in a wireless network refer to nodes that are out of range of other nodes or a collection of nodes. In the wireless ad-hoc network 100 of FIG. 1, node G at the far edge of the network 100 may be able to see node F in the middle of the network 100, but may not be able to see node C on the other end of the network 100. Accordingly, problems may arise when nodes G and C start to send packets simultaneously to node F. Since nodes G and C cannot sense each other's carriers, Carrier Sense Multiple Access with Collision Avoidance (CSMA/CA) is not sufficient to prevent collisions from occurring and data from being scrambled. Exposed nodes occur when a node is prevented from sending packets to other nodes due to a neighboring transmitter. In the wireless ad-hoc network 100 of FIG. 1, nodes A and G on the fringes of the network 100 may be out of range of one another while nodes E and H in the middle may be in range of each other. Here, if a transmission from node E to node A is taking place, node H is prevented from transmitting to node G since it concludes after carrier sense that it will interfere with the transmission by its neighbor node E. However, node G could still theoretically receive the transmission of node H without interference because it is out of range from node E. Thus, hidden and exposed nodes often cause problems for Media Access Control (MAC) because specific portions of the network are prevented from reusing the same bandwidth. A network's ability to reuse the same bandwidth over a given area is typically referred to as "spatial reuse."

One example UWB communication system, ECMA-368, addresses the hidden node problem with a Distributed Reservation Protocol (DRP) where synchronizing beacon signals are broadcast by neighboring devices. The ECMA-368 standard, titled "High Rate Ultra Wideband PHY and MAC Standard," second edition, December 2007, defines the PHY and MAC layers for a UWB network formed pursuant thereto and is incorporated herein by reference. A device in such a communication system that wishes to transmit information on one or more Media Access Slots (MAS) of a superframe can request to reserve (in advance) one or more MAS time slots using the DRP mechanism. Reservation negotiation is initiated by the device that will initiate frame transactions in the reservation, which is then referred to as the reservation "owner." The device that will receive information is referred to as the reservation "target." A typical beacon frame includes a DRP Information Element (IE) that identifies the MAS time slot reservations for that node (either as reservation owner or reservation target) with its neighboring nodes, as well as, among other elements, a DRP Availability IE that indicates a device's availability for new DRP reservations. The DRP IE may also be referred to as a DRP Reservation IE to distinguish it from the DRP Availability IE.

In this way, the DRP mechanism enlarges a "blocking area" around a communication link to guard against hidden nodes. However, the inventors have recognized that the DRP mechanism actually aggravates the exposed node problem because opportunities for concurrent transmissions are wasted. As discussed above, for a MAC to support simultaneous transmissions, both the neighboring nodes need to be either receivers or transmitters; simultaneous transmission is not possible when a receiver and transmitter are neighbors. Even for the case when both the neighboring nodes are transmitters or receivers, though, there is the problem of reverse direction traffic in the form of acknowledgments that greatly reduce spatial reuse.

SUMMARY

Exemplary embodiments of the invention are directed to systems and methods for increasing spatial reuse in wireless ad-hoc networks.

In one embodiment, a method of facilitating communication in a wireless ad-hoc network comprises: generating, at a node in the wireless ad-hoc network, target availability information with regard to one or more transmission slots, the target availability information indicating whether the node is permitted to receive a transmission during each transmission slot; generating, at the node, owner availability information with regard to one or more transmission slots, the owner availability information indicating whether the node is permitted to transmit during each transmission slot; and broadcasting, from the node, the target availability information and the owner availability information to separately indicate availability as either an owner or a target for one or more transmission slots.

In another embodiment, a wireless communication device for communicating as a node in a wireless ad-hoc network comprises: logic configured to generate target availability information for the node with regard to one or more transmission slots, the target availability information indicating whether the node is permitted to receive a transmission during each transmission slot; logic configured to generate owner availability information of the node with regard to one or more transmission slots, the owner availability information indicating whether the node is permitted to transmit during each transmission slot; and logic configured to broadcast, from the node, the target availability information and the owner availability information to separately indicate availability as either an owner or a target for one or more transmission slots.

In another embodiment, a wireless communication device for communicating as a node in a wireless ad-hoc network comprises: means for generating target availability information for the node with regard to one or more transmission slots, the target availability information indicating whether the node is permitted to receive a transmission during each transmission slot; means for generating owner availability information of the node with regard to one or more transmission slots, the owner availability information indicating whether the node is permitted to transmit during each transmission slot; and means for broadcasting, from the node, the target availability information and the owner availability information to separately indicate availability as either an owner or a target for one or more transmission slots.

In another embodiment, a computer-readable storage medium comprises code, which, when executed by a processor, causes the processor to perform operations for facilitating wireless communication as a node in a wireless ad-hoc network. The computer-readable storage medium comprises: code for generating target availability information for the node with regard to one or more transmission slots, the target availability information indicating whether the node is permitted to receive a transmission during each transmission slot; code for generating owner availability information of the node with regard to one or more transmission slots, the owner availability information indicating whether the node is permitted to transmit during each transmission slot; and code for broadcasting, from the node, the target availability information and the owner availability information to separately indicate availability as either an owner or a target for one or more transmission slots.

In another embodiment, a method of facilitating communication in a wireless ad-hoc network comprises: identifying, at the node, at least one neighboring node that supports directional transmission; exchanging request to train and clear to train packets with the neighboring node via omni-directional transmission to initiate directional antenna training of a plurality of directional antennas; exchanging antenna training and feedback frames with the neighboring node via directional transmission to train the plurality of directional antennas; and transmitting at least one data packet to the neighboring node via the trained plurality of directional antennas.

In another embodiment, a wireless communication device for communicating as a node in a wireless ad-hoc network comprises: logic configured to identify, at the node, at least one neighboring node that supports directional transmission; logic configured to exchange request to train and clear to train packets with the neighboring node via omni-directional transmission to initiate directional antenna training of a plurality of directional antennas; logic configured to exchange antenna training and feedback frames with the neighboring node via directional transmission to train the plurality of directional antennas; and logic configured to transmit at least one data packet to the neighboring node via the trained plurality of directional antennas.

In another embodiment, a wireless communication device for communicating as a node in a wireless ad-hoc network comprises: means for identifying, at the node, at least one neighboring node that supports directional transmission; means for exchanging request to train and clear to train packets with the neighboring node via omni-directional transmission to initiate directional antenna training of a plurality of directional antennas; means for exchanging antenna training and feedback frames with the neighboring node via directional transmission to train the plurality of directional antennas; and means for transmitting at least one data packet to the neighboring node via the trained plurality of directional antennas.

In another embodiment, a computer-readable storage medium comprises code, which, when executed by a processor, causes the processor to perform operations for facilitating wireless communication as a node in a wireless ad-hoc network. The computer-readable storage medium comprises: code for identifying, at the node, at least one neighboring node that supports directional transmission; code for exchanging request to train and clear to train packets with the neighboring node via omni-directional transmission to initiate directional antenna training of a plurality of directional antennas; code for exchanging antenna training and feedback frames with the neighboring node via directional transmission to train the plurality of directional antennas; and code for transmitting at least one data packet to the neighboring node via the trained plurality of directional antennas.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. Further, the terms "node" and "device" are used interchangeably herein.

The terminology used herein is for the purpose of describing particular embodiments only and is not intended to be limiting of embodiments of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the disclosed subject matter. In addition, for each of the embodiments described herein, the corresponding form of any such embodiments may be described herein as, for example, "logic configured to" perform the described action.

For explanatory purposes, the following description describes techniques for enhancing spatial reuse generally in the context of ECMA-368 systems. However, it will be appreciated that the disclosed enhancements are generic enough to be applicable to any Time-Division Multiple Access (TDMA) Media Access Control (MAC).

Figure 2:
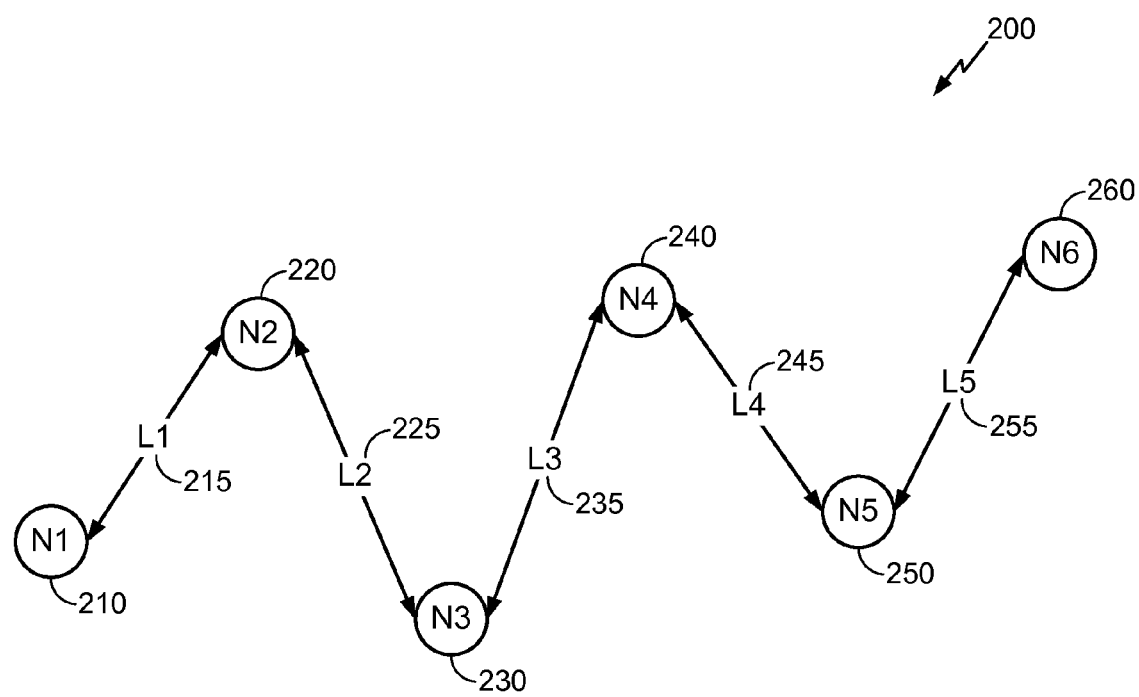
FIG. 2 illustrates a second wireless ad-hoc network formed by a plurality of nodes.

FIG. 2 illustrates a wireless ad-hoc network 200 formed by a first node 210, a second node 220, a third node 230, a fourth node 240, a fifth node 250, and a sixth node 260, labeled N1-N6, respectively. The network 200 includes a first link 215 (labeled L1) between the first node 210 and the second node 220, a second link 225 (labeled L2) between the second node 220 and the third node 230, a third link 235 (labeled L3) between the third node 230 and the fourth node 240, a fourth link 245 (labeled L4) between the fourth node 240 and the fifth node 250, and a fifth link 255 (labeled L5) between the fifth node 250 and the sixth node 260. In this example, there are no other communication links among the nodes. However, there may be an end to end flow from the first node 210 to the sixth node 260 through the intermediate nodes 220, 230, 240, and 250, but this is not required. Communications occur via a common access medium, such as through Time-Frequency Interleaving (TFI) or Fixed Frequency Interleaving (FFI) in ECMA-368. For discussion purposes, traffic flow in the direction of the sixth node 260 side of the network 200 from the first node 210 side of the network 200 is referred to as downstream, whereas traffic flow in the direction of the first node 210 side of the network 200 from the sixth node 260 side of the network 200 is referred to as upstream.

A node cannot transmit to a first neighboring node while a second neighboring node is receiving data because the two signals will interfere with each other at the second neighboring node. Conversely, a node cannot receive data from a first neighboring node while a second neighboring node is transmitting because again the signals will interfere with each other. For example, with reference to FIG. 2, if the third node 230 is transmitting to the fourth node 240, then the second node 220 cannot transmit to the third node 230 because the third node 230 cannot simultaneously transmit and receive. That is, the third node 230 would not be able to properly receive the transmission from the second node 220. The second node 220 can, though, transmit to the first node 210 since this transmission will not prevent the fourth node 240 from properly receiving the transmission from the third node 230, nor will the transmission from the third node 230 prevent the first node 210 from properly receiving a transmission from the second node 210. However, the first node 210 cannot transmit to the second node 230 because such a transmission will be interfered with by the transmission of the third node 230 to fourth node 240 at the second node 220. Similarly, the fifth node 250 cannot transmit to the fourth node 240 or the sixth node 260 because such a transmission will interfere with the transmission from the third node 230 at the fourth node 240. Like the first node 210 though, the sixth node 260 can transmit to the fifth node 250 without interfering with the transmission from the third node 230 to the fourth node 240. Thus, the second node 220, which is a neighboring node of the transmitting third node 230, can still transmit and the fifth node 250, which is a neighboring node of the receiving fourth node 240, can still receive while the third node 230 is transmitting to the fourth node 240.

Accordingly, in the downstream direction from the first node 210, none of the other links 215, 225, 245, and 255 can transmit simultaneously with the third link 235. In the upstream direction, the first link 215 and the fifth link 255 can in fact transmit simultaneously with the third link 235, whereas the second link 225 and the fourth link 245 cannot.

Table 1 below summarizes the permissible simultaneous transmissions for the network 200 of FIG. 2 described above when the third node 230 is transmitting to the fourth node 240. In the table, "Y" indicates that a particular transmission is allowed and "X" indicates that a particular transmission is not allowed.

TABLE 1

| Links | L1 | L2 | L3 | L4 | L5 |
| --- | --- | --- | --- | --- | --- |
| Upstream Transmission | Y | X | X | X | Y |
| Downstream Transmission | X | X | [In use] | X | X |

As discussed above, conventional DRP reservations such as in the ECMA-368 MAC do not take full advantage of these opportunities for concurrent transmissions. For example, in the context of Table 1, even though it is possible to transmit upstream on both the first link 215 and the fifth link 255 concurrently with the downstream transmission on the third link 235, the conventional DRP mechanism ignores these transmission opportunities. This is because DRP reservations in conventional ECMA-368 systems, for example, provide a combined indication of whether a particular slot in the superframe at a given node is available for new reservations as both reservation owner and target, which in the above example corresponds to availability for upstream and downstream communications.

In more detail, for communication from the third node 230 to the fourth node 240, the third node 230 is considered the DRP reservation owner (i.e., the device that will initiate frame transactions in the reservation) and the fourth node 240 is considered the DRP reservation target (i.e., the device that will receive information in the reservation). The DRP Availability IE only identifies slots in which a node can act both as a reservation owner and reservation target. Therefore, for the scenario depicted in FIG. 2, a DRP Availability IE for the first node 210 indicates unavailability for those slots during which the third node 230 communicates with the fourth node 240 because the first node 210 would only be able to reserve those slots as a target, not as both target and owner. A similar scenario arises for the second node 220, which would only be able to reserve those slots as an owner, the fifth node 250, which would only be able to reserve those slots as a target, and the sixth node 260, which would only be able to reserve those slots as an owner. (It will be appreciated that, while the sixth node 260 does not have a second neighboring node in the example of FIG. 2, such an additional neighboring node would allow the sixth node 260 to reserve those slots as a reservation target of the additional neighboring node as well.) Hence, upstream transmissions in the first link 215 and fifth link 255, though possible, is not allowed in the conventional ECMA-368 MAC.

Accordingly, embodiments disclosed herein provide a mechanism for distinguishing a node's availability as a reservation owner or reservation target.

Figure 3:
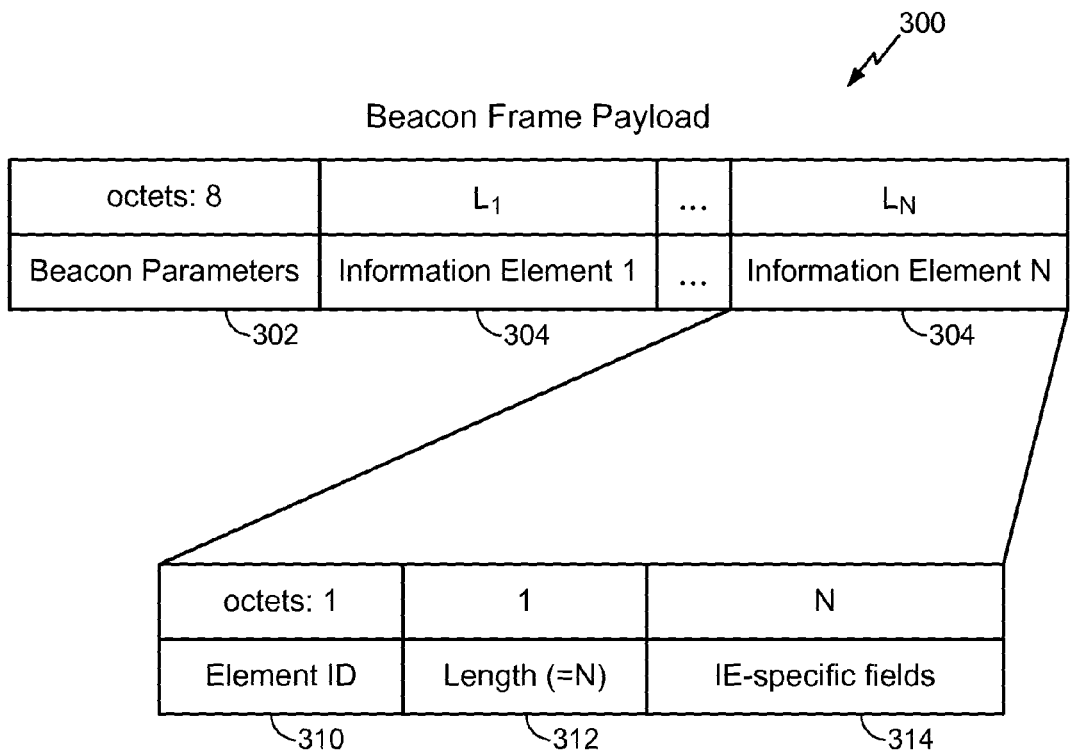
FIG. 3 illustrates an example beacon frame payload.

FIG. 3 illustrates an ECMA-368 beacon frame payload 300. As shown, the beacon frame payload 300 includes beacon parameters 302 and a number of IEs 304. Each IE 304 includes an Element ID field 310 that identifies the particular IE 304, an IE-specific field 314 containing information specific to the IE 304, and a length field 312 that indicates the length of the IE-specific field 314. Table 116 of the ECMA-368 specification lists the different IEs 304 that may be included in the beacon frame payload 300. There are also a few reserved Element IDs, such as Element IDs 25-249 and 252-254, which are available for future implementation(s).

Figure 4:
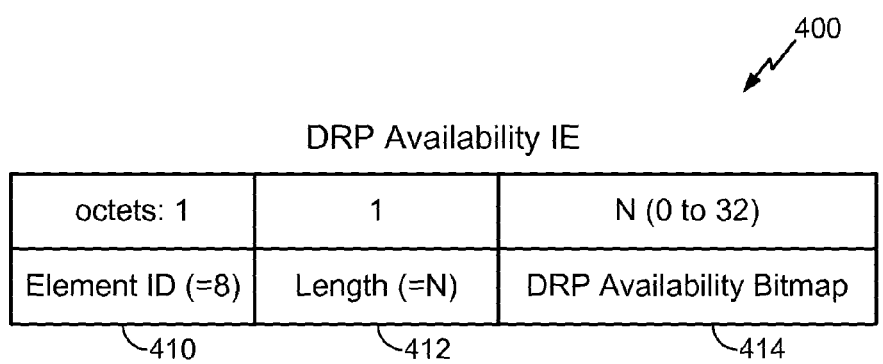
FIG. 4 illustrates an example DRP Availability IE.

FIG. 4 illustrates a DRP Availability IE 400, which corresponds to Element ID=8 in the ECMA-368 specification. The DRP Availability IE includes an Element ID field 410, a Length field 412, and a DRP Availability Bitmap field 414. The Element ID field 410 is set to Element ID=8 and the Length field 412 is set to length=N, where N is the number of octets of bits in the DRP Availability Bitmap field 414. The DRP Availability Bitmap field 414 can be up to 256 bits long (i.e., up to 32 octets), one bit for each slot in the superframe. The least-significant bit of the DRP Availability Bitmap field 414 corresponds to the first slot in the superframe and successive bits correspond to successive slots. Each bit is set to ONE if the device is available for a DRP reservation in the corresponding slot, or is set to ZERO otherwise. If the DRP Availability Bitmap field 414 is smaller than 32 octets, the bits in octets not included at the end of the bitmap are treated as ZERO.

In one embodiment, the single DRP Availability IE 400 is superseded by two new IEs that are provided as IEs 304 in the beacon frame payload 300: a DRP Availability IE as a reservation owner ("DRP Owner Availability IE") and a DRP Availability IE as a reservation target ("DRP Target Availability IE"). The DRP Owner Availability IE and DRP Target Availability IE may each be assigned a reserved Element ID identifying it as corresponding to either target or owner availability information. The DRP Owner Availability IE and DRP Target Availability IE can maintain the same format as the original DRP Availability IE 400. For example, the DRP Owner Availability IE can be assigned the Element ID=25 and the DRP Target Availability IE can be assigned the Element ID=26 in an ECMA-368 system.

In another embodiment, the original DRP Availability IE 400 is supplemented with a new IE explicitly indicating incremental DRP availability information of the node as owner and/or target ("DRP Supplemental Availability IE"). The DRP Supplemental Availability IE is provided as an additional IE 304 in the beacon frame payload 300. The original DRP Availability IE is modified to convey the MAS slots where the node is available as either reservation owner or reservation target, which is different from the conventional scheme where the DRP Availability IE is used to convey the MAS slots where the node can act as both reservation owner and reservation target. The DRP Supplemental Availability IE then conveys the additional information about MAS slots during which the node can act as reservation owner and the MAS slots during which the node can act as reservation target. In either case, the total DRP availability information as either owner or target can be constructed from the original DRP Availability IE and the new DRP Supplemental Availability IE. The DRP Supplemental Availability IE can also maintain a similar format to the original DRP Availability IE 400, but with a further indication of whether it corresponds to target or owner availability information. For example, the length field 412 of a DRP Availability IE 400 in an ECMA-368 system is one octet of bits and can indicate up to 32 octets in the corresponding bitmap field 414, which means that the two most significant bits are not used (i.e., they are always ZERO). Thus, the most significant bit can be used to indicate if the additional availability is as an owner (e.g., ONE) or as a target (e.g., ZERO). As in the previous example, the DRP Supplemental Availability IE can be configured to use a reserved Element ID (e.g., Element ID=25) in an ECMA-368 system.

In another embodiment, the original DRP Availability IE 400 is modified to use 64 octets for the complete Bitmap field 414, which allows for target and owner availability to be indicated using only one IE. For example, the modified DRP Availability IE may use two bits per MAS slot to indicate its availability (e.g., '00' indicating no availability as either owner or target, '01' indicating availability only as a target, '10' indicating availability only as an owner, and '11' indicating availability as both an owner and a target). If the DRP Availability Bitmap field 414 is smaller than 64 octets, the bits in the octets not included at the end of the bitmap may be treated as 00. This modified DRP Availability IE may alternatively be provided as a new IE using a reserved Element ID (e.g., Element ID=25) in an ECMA-368 system.

In general, each node's advertised availabilities will depend on the reservation information gathered from neighboring nodes, such as via DRP Reservation IEs in one or more beacon frames.

Figure 5:
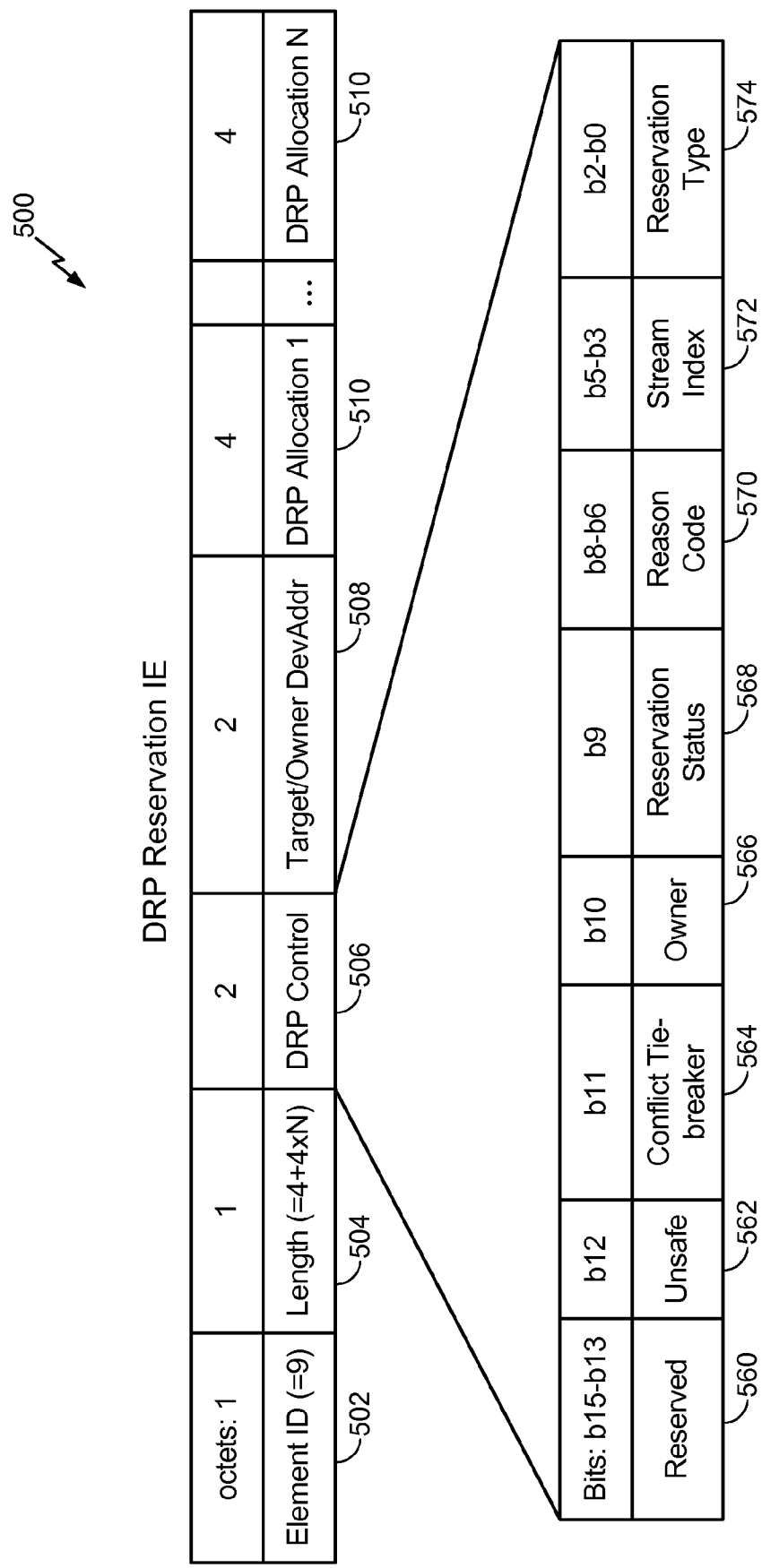
FIG. 5 illustrates an example DRP Reservation IE.

FIG. 5 illustrates a DRP Reservation IE 500, which corresponds to Element ID=9 in the ECMA-368 specification. As shown, the DRP Reservation IE 500 includes an Element ID field 502, a Length field 504, a DRP Control field 506, a Target/Owner DevAddr field 508, and a number of DRP Allocation fields 510. The Element ID field 502 is set to Element ID=9 and the Length field 504 is set to length=4+4× N, where N is the number of DRP Allocation fields 510. Each DRP Allocation field 510 is encoded using a zone structure corresponding to a splitting of the superframe. The Target/Owner DevAddr field 508 is set to the device address of the reservation target if the device transmitting the DRP Reservation IE 500 is the reservation owner. The reservation target may be a unicast or multicast device address. The Target/Owner DevAddr field 508 is set to the device address of the reservation owner if the device transmitting the DRP Reservation IE 500 is a reservation target.

The Control field 506 is composed of several sub-fields, including a Reserved field 560 (bits b15-b13), an Unsafe field 562 (bit b12), a Conflict Tie-breaker field 564 (bit b11), an Owner field 566 (bit b10), a Reservation Status field 568 (bit b9), a Reason Code field 570 (bits b8-b6), a Stream Index field 572 (bits b5-b3), and a Reservation Type field 574 (bits b2-b0). The Reservation Type field 574 indicates the type of reservation (e.g., Alien BP, Hard, Soft, Private, Prioritized Contention Access (PCA)). The Stream Index field 572 identifies the stream of data to be sent in the reservation. The Reason Code field 570 is used by a reservation target to indicate whether a DRP reservation request was successful. The Reservation Status field 568 bit is set to ZERO in a DRP Reservation IE for a reservation that is under negotiation or in conflict, and is set to ONE by a device granting or maintaining a reservation, which is then referred to as an established reservation. The Owner field 566 bit is set to ONE if the device transmitting the DRP Reservation IE 500 is the reservation owner, or to ZERO if the device transmitting the DRP Reservation IE 500 is a reservation target. The Conflict Tie-breaker field 564 bit is set to a random value of ZERO or ONE when a reservation request is made. The Unsafe field 562 bit is set to ONE if any of the MAS slots identified in the DRP Allocation fields is considered in excess of reservation limits.

Using this reservation information, a device can generate separate target/owner availabilities and advertise them to its neighbors (e.g., via DRP Owner Availability IEs and DRP Target Availability IEs).

Figure 6:
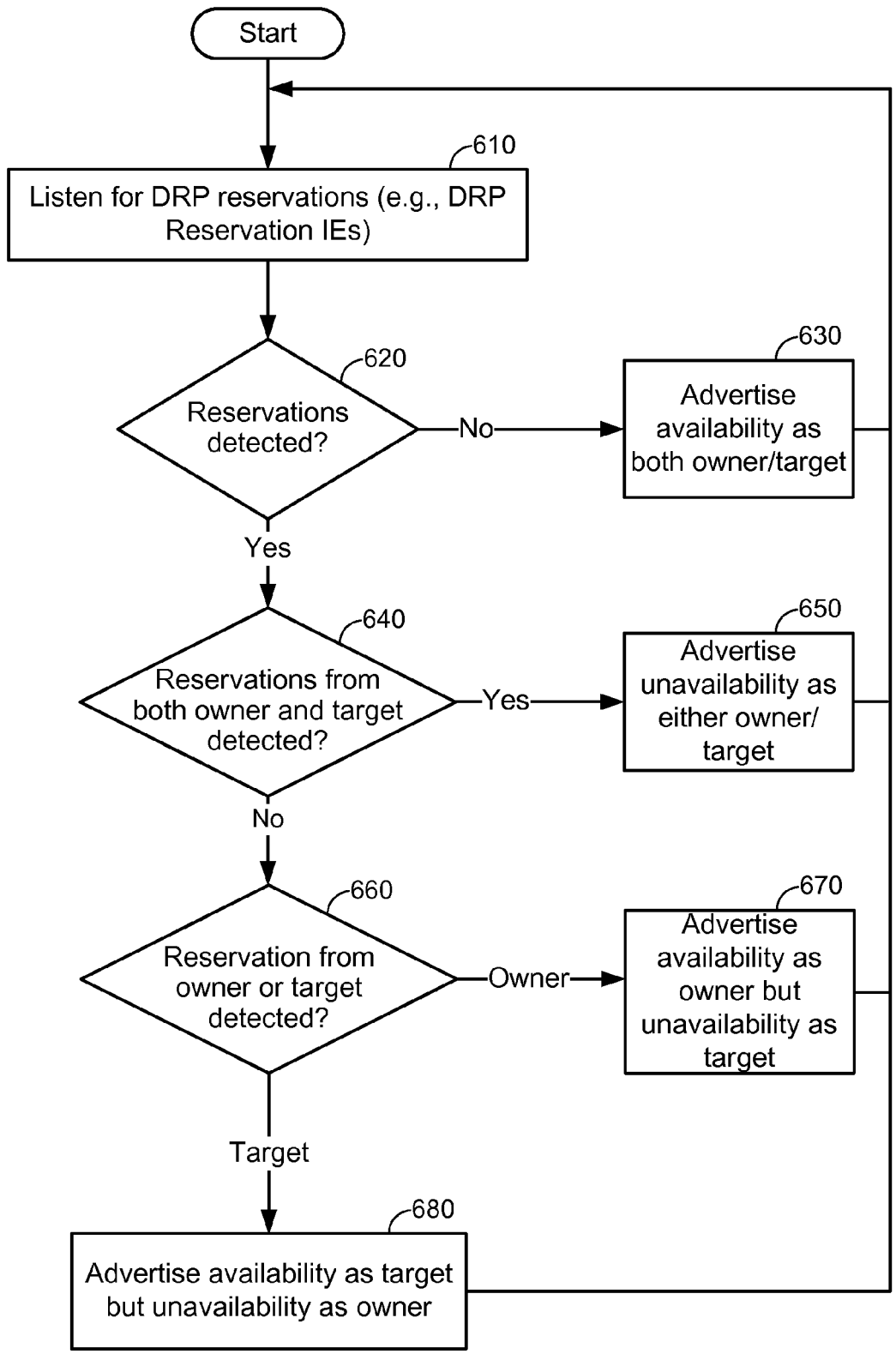
FIG. 6 is a flow diagram illustrating generation of separate target and owner availabilities based on reservation information from neighboring nodes.

FIG. 6 is a flow diagram illustrating generation of separate target and owner availabilities based on reservation information from neighboring nodes.

Each node listens for DRP reservations (e.g., DRP Reservation IEs) in beacon frames from neighboring nodes identifying particular MAS slot reservations (block 610). Similar to the conventional system, if a node does not detect a DRP reservation for a given MAS slot from either an owner or from a target ('No' at block 620), the node advertises availability for that MAS as both a reservation target and owner (block 630). If a node does detect DRP reservations ('Yes' at block 620) and the DRP reservations include a reservation from an owner and also a reservation from a target for one or more MAS slots ('Yes' at block 640), the node advertises unavailability for those MASs as either a reservation target or owner (block 650).

However, the flow diagram of FIG. 6 differs from the conventional method when the detected DRP reservations are not from both an owner and a target ('No' at block 640). If the node detects a DRP reservation for one or more MAS slots from an owner, but not from a target ('Owner' at block 660), the node then advertises itself as available during those MAS slots as a reservation owner (e.g., via a DRP Owner Availability IE) but unavailable as a reservation target (e.g., via a DRP Target Availability IE) (block 670). Conversely, if the node detects a DRP reservation for one or more MAS slots from a target, but not from an owner ('Target" at block 660), then the node advertises itself as available during those MAS slots as a reservation target (e.g., via a DRP Target Availability IE) but unavailable as a reservation owner (e.g., via a DRP Owner Availability IE) (block 680).

As an example, consider the scenario depicted in FIG. 2 and discussed above where the third node 230 is communicating with the fourth node 240, this time using MAS slots 1 through 5. The third node 230 is considered the owner and the fourth node 240 is considered the target of each corresponding MAS slot reservation. Table 2 below summarizes the DRP availability as reservation owner and target for the second node 220 ("N2") and the fifth node 250 ("N5") during the transmission ("N3-N4"). In the table, "X" indicates that an MAS slot is reserved while "Y" indicates that an MAS slot is available as the noted target and/or owner. For illustration purposes, DRP reservation is shown as indicated in a DRP Reservation IE, and DRP availability is shown as indicated in a single DRP Availability IE (as both owner and target) as well in separate DRP Owner and DRP Target Availability IEs.

TABLE 2

| MAS Slots | 1 | 2 | 3 | 4 | 5 | 6 | 7 | 8 | 9 | 10 |
|---|---|---|---|---|---|---|---|---|---|---|
| N3-N4 DRP Reservation IE | X | X | X | X | X | | | | | |
| N2 DRP Availability IE (Owner and Target) | | | | | | Y | Y | Y | Y | Y |
| N2 DRP Owner Availability IE | Y | Y | Y | Y | Y | Y | Y | Y | Y | Y |
| N2 DRP Target Availability IE | | | | | | Y | Y | Y | Y | Y |
| N5 DRP Availability IE (Owner and Target) | | | | | | Y | Y | Y | Y | Y |
| N5 DRP Owner Availability IE | | | | | | Y | Y | Y | Y | Y |
| N5 DRP Target Availability IE | Y | Y | Y | Y | Y | Y | Y | Y | Y | Y |

Under this example scenario, and with reference back to FIGS. 2 and 6, the second node 220 detects a DRP reservation from an owner in its beacon (i.e., the third node 230), but not from a target (i.e., the fourth node 240) for MAS slots 1 through 5 ('Owner' at block 660). Accordingly, the second node 220 advertises its availability as a reservation owner in its DRP Owner Availability IE but unavailability as a reservation target in its DRP Target Availability IE (block 670). The fifth node 250 detects a DRP reservation from a target (i.e., the fourth node 240), but not from an owner (i.e., the third node 230) for MAS slots 1 through 5 ('Target' at block 660). Accordingly, the fifth node 250 advertises its availability as a reservation target in its DRP Target Availability IE but unavailability as a reservation owner in its DRP Owner Availability IE (block 680). For both the second node 220 and the fifth node 250, the conventional DRP Availability IE indicates complete unavailability for MAS slots 1 through 5.

In the subsequent MAS slots 6 through 10, neither the second node 220 nor the fifth node 250 detects DRP reservations from an owner (e.g., the third node 230) or from a target (e.g., the fourth node 240). Thus, the second node 220 and the fifth node 250 each advertise availability for those MAS slots in their respective DRP Availability IE, DRP Owner Availability IE, and DRP Target Availability IE.

Accordingly, as demonstrated above, the MAS slots during which a node can be a reservation owner may overlap partially or completely with the MAS slots during which the node can be a reservation target. There may be MAS slots during which the node can be a reservation owner only or a reservation target only. There may also be scenarios where the MAS slots during which a node can be the reservation owner form a subset of the MAS slots during which the node can be a reservation target, and vice versa.

Therefore, advertising separate owner/target availability information in this manner allows any node that indicates availability as a reservation owner to establish a DRP reservation as an owner with any node that indicates availability as a reservation target. Thus, it will be appreciated that the upstream transmissions in the first link 215 and fifth link 255 of FIG. 2, which are not permitted by the conventional ECMA-368 MAC when a concurrent downstream transmission takes place on the third link 235, are both allowed according to the disclosed embodiments. This provides more efficient spatial reuse in wireless ad-hoc networks by taking advantage of transmission opportunities missed by the conventional DRP mechanism.

Figure 7:
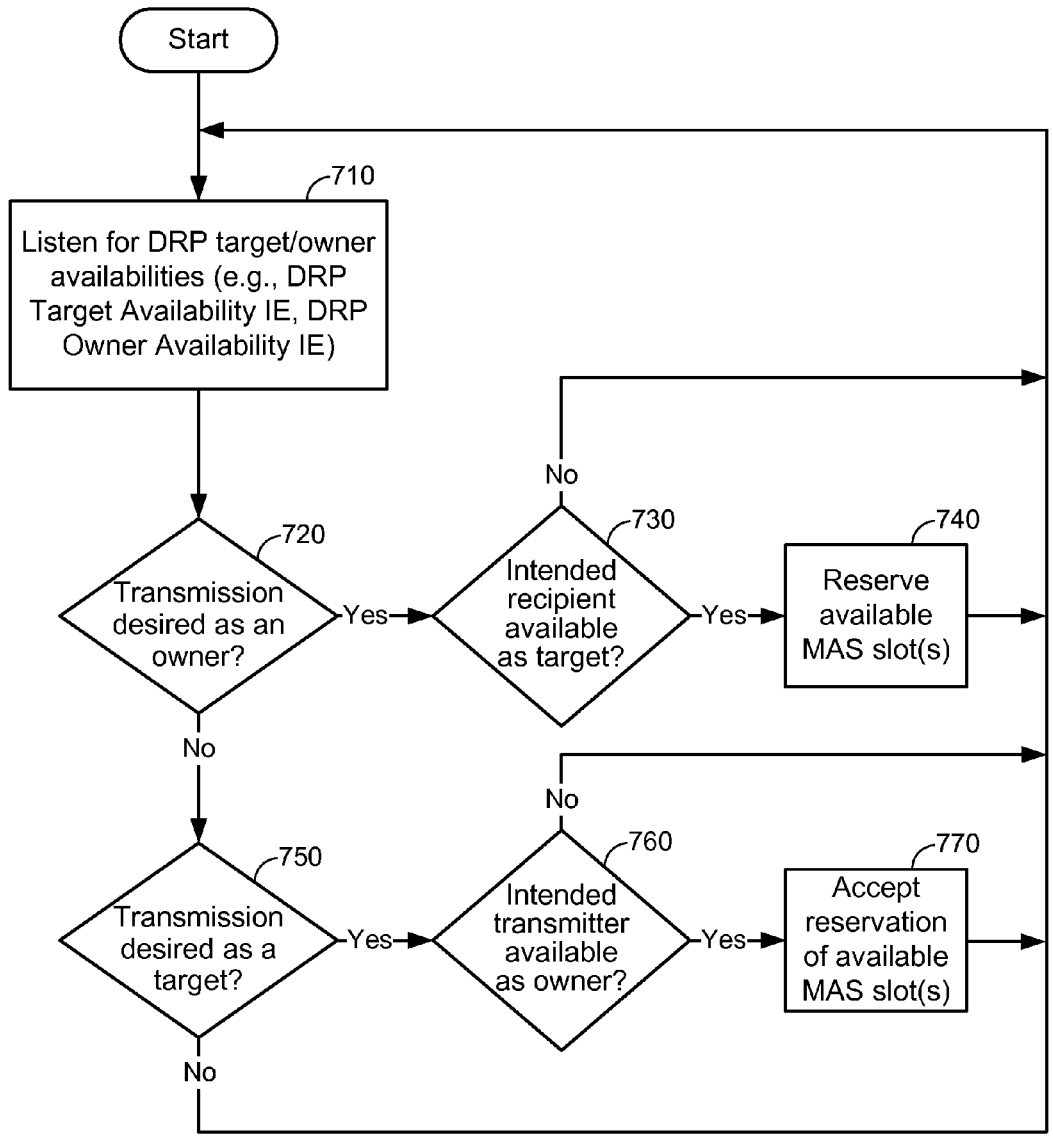
FIG. 7 is a flow diagram illustrating generation of reservation requests using separate indications of target and owner availability.

FIG. 7 is a flow diagram illustrating generation of reservation requests using separate indications of target and owner availability.

As shown, each node listens for DRP target/owner availabilities (e.g., DRP Target Availability IEs and/or DRP Owner Availability IEs) in beacon frames from neighboring nodes identifying particular MAS slot availabilities (block 710). In general, nodes that indicate availability as a reservation owner can send reservation requests during those available MAS slots and neighboring nodes that indicate availability as a reservation target can accept reservations during those available MAS slots. Thus, if a node desires to transmit information as a transmission owner ('Yes' at block 720) and the intended recipient is available as a target for one or more MAS slots ('Yes' at bock 730), the node may reserve those available MAS slots for subsequent transmission (block 740). Conversely, if a node desires to receive information as a transmission target ('Yes' at block 750) and the intended transmitter is available as an owner for one or more MAS slots ('Yes' at bock 760), the node may accept reservations of those available MAS slots for subsequent reception (block 770).

Returning to the example scenario summarized in Table 2 above, and with reference to FIGS. 2 and 7, when the third node 230 is communicating with the fourth node 240 during MAS slots 1 through 5, the second node 220 broadcasts availability as a reservation owner (e.g., via a DRP Owner Availability IE) and the fifth node 250 broadcasts availability as a reservation target (e.g., via a DRP Target Availability IE) for those MAS slots. Accordingly, if the sixth node 260 desires to transmit information as a transmission owner ('Yes' at block 720) to the fifth node 250, which is available as a target for MAS slots 1 through 5 ('Yes' at bock 730), the sixth node may reserve one or more of MAS slots 1 through 5 for subsequent transmission (block 740). Conversely, if the first node 210 desires to receive information as a transmission target ('Yes' at block 750) from the second node 220, which is available as an owner for MAS slots 1 through 5 ('Yes' at bock 760), the first node 210 may accept reservations of one or more of MAS slots 1 through 5 for subsequent reception (block 780). Again, whereas these transmissions are not permitted by the conventional ECMA-368 MAC, for example, they are in fact permitted by the disclosed embodiments.

Figure 8:
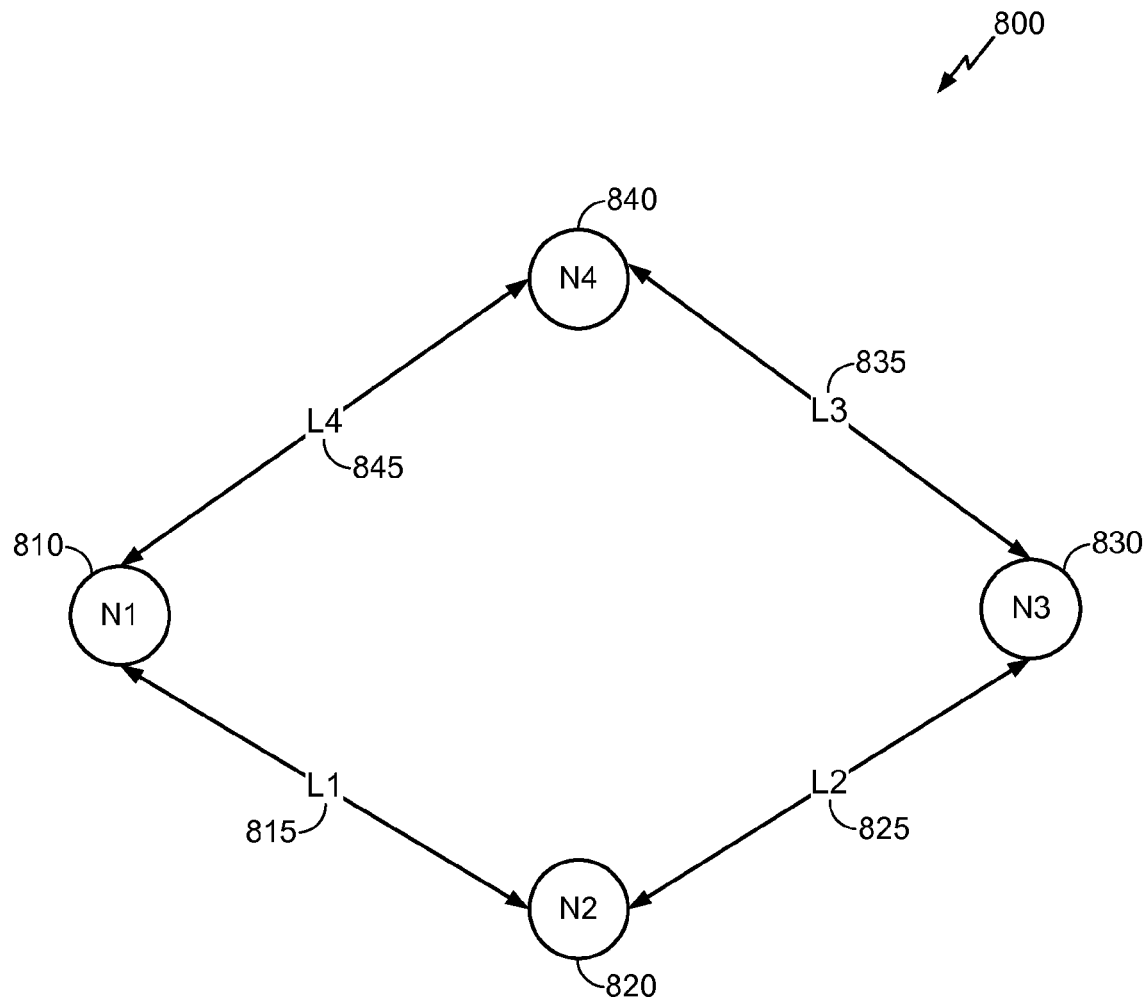
FIG. 8 illustrates a third wireless ad-hoc network formed by a plurality of nodes.

FIG. 8 illustrates an example wireless ad-hoc network in a different configuration than the wireless ad-hoc network of FIG. 2 in that each node shares a link with more than one other node. That is, there are no true endpoints like the first node 210 and the sixth node 260 of FIG. 2. This network configuration may be referred to as a closed loop configuration.

As shown, the wireless ad-hoc network 800 of FIG. 8 includes a first node 810, a second node 820, a third node 830, and a fourth node 840, labeled N1-N4, respectively. The one-hop neighbors are indicated by a first link 815 (labeled L1) between the first node 810 and the second node 820, a second link 825 (labeled L2) between the second node 820 and the third node 830, a third link 835 (labeled L3) between the third node 830 and the fourth node 840, and a fourth link 825 (labeled L4) between the fourth node 840 and the first node 810. The absence of a link between nodes indicates that they are out of range of each other. Accordingly, the one-hop neighbors of the first node 810 are the fourth node 840 and the second node 820, the one-hop neighbors of the second node 820 are the first node 810 and the third node 830, the one-hop neighbors of the third node 830 are the second node 820 and the fourth node 840, and the one-hope neighbors of the fourth node 840 are the first node 810 and the third node 830.

Table 3 below summarizes the permissible simultaneous transmissions for the network 800 of FIG. 8 described above when the third node 830 is transmitting to the fourth node 840. In the table, "Y" indicates that a particular transmission is allowed and "X" indicates that a particular transmission is not allowed. For description purposes, the link communication direction is referenced with respect to the orientation shown in FIG. 8 (i.e., either clockwise or counter-clockwise).

TABLE 3

| Links | L1 | L2 | L3 | L4 |
| --- | --- | --- | --- | --- |
| Clockwise Transmission | Y | X | X | X |
| Counter-Clockwise Transmission | X | X | [In use] | X |

As can be seen here, despite the network configuration differences, the permissible transmissions for the first through fourth links 815, 825, 835, 845 of FIG. 8 in Table 3 are identical to those in Table 1 with respect to FIG. 2. Accordingly, a concurrent transmission from the second node 820 to the first node 810 on the first link 815 is also possible in this network configuration. Again, though, conventional DRP reservations such as in the ECMA-368 MAC prevent this transmission opportunity because the first node 810 and the second node 820 are only given a single indication that the first link 815 is unavailable. However, using separate indications of target/owner availability in the wireless ad-hoc network of FIG. 8 according to the embodiments disclosed herein allows the second node 820 to recognize that it can in fact transmit as a reservation owner and allows the first node 810 to recognize that it can in fact receive as a reservation target.

In some cases, it is possible for a node to alternate between transmitter and receiver roles during a DRP reservation. For example, in a system employing automatic repeat requests (ARQ), the target of a DRP reservation sends an acknowledgement (ACK) for the data frames sent by the transmitting owner. ACKs may be sent for each received frame, as in an Immediate ACK (I-ACK) scheme, or for groups of received frames, as in a Block ACK (B-ACK) scheme. This restricts parallel transmissions because collisions may arise between one flow's forward traffic and another other flow's reverse traffic. In the case of no acknowledgement policy, this issue is not present and is therefore ignored in most of the related art for enhancing spatial reuse.

Accordingly, while the preceding embodiments have considered the owner of a DRP reservation to be the transmitter and the target of a DRP reservation to be the receiver, this is not always true. The reservation target may also act as transmitter, for example, such as when sending ACKs. During these transmissions, the target may interfere with other concurrent transmissions. Thus, there is chance that the ACKs may be scrambled due to the other transmissions, and vice versa. Mitigation techniques for these problems related to reverse traffic in the enhanced spatial reuse embodiments described herein are therefore discussed below.

In one embodiment, a flag is provided for use while setting up a first (i.e., primary) transmission to either enable or disable the enhanced spatial reuse techniques described above. For example, the enable/disable spatial reuse flag may be integrated into the DRP Reservation IE 500 of FIG. 5 as one of the reserved bits b15-b13 in the Reserved field 560. A subsequent (i.e., secondary) transmission that would interfere with reverse traffic is then allowed to proceed only if the flag is enabled. For example, only MAS slots indicated by the DRP Availability IE as available for both target/owner reservation may be used when the flag is disabled. That is, when the flag indicates 'disabled,' the fallback mode of operation is the conventional ECMA-368 scheme, and there is no additional spatial reuse as compared to ECMA-368. Thus, the primary transmission can be protected (e.g., protecting the integrity of ACK messages) by selectively disabling secondary transmissions.

In another embodiment, a partition is provided within the MAS slot or DRP reservation to allow spatial reuse in the first partition. In a per MAS slot partitioning scheme, each MAS slot may be partitioned into a spatial reuse permissible zone (e.g., a first portion usually used to carry forward traffic) and spatial reuse non-permissible zone (e.g., a second portion usually used for ACK reverse traffic). By ensuring no secondary transmission in the latter portion, the probability of ACKs colliding with secondary transmissions is reduced. In a per reservation partitioning scheme, a first set of one or more MAS slots may be marked as spatial reuse permissible and a subsequent set of MAS slots may be marked as spatial reuse non-permissible. Per reservation partitioning is useful when reservations span multiple MAS slots. In both schemes, the partitioning may be static, or the spatial reuse non-permissible portion may be triggered dynamically, such as by the primary transmission receiving an ACK. Partitioning benefits transmissions that do not need the entire MAS or DRP reservations. The range of partition values provides flexibility to move from a spatial reuse friendly regime to a non-spatial reuse regime. Partitioning also offers more flexibility and granularity in terms of enabling spatial reuse involving exposed nodes.

In addition to reverse traffic considerations, spatial reuse may also be limited by the beacon transmission range. If the beacon transmission range and interference range are considered as concentric spheres for omni-directional transmissions with the beacon transmission range being less than the interference range, there is a small annulus region where the beacon might not be decoded but the transmissions still cause interference.

Figure 9A:
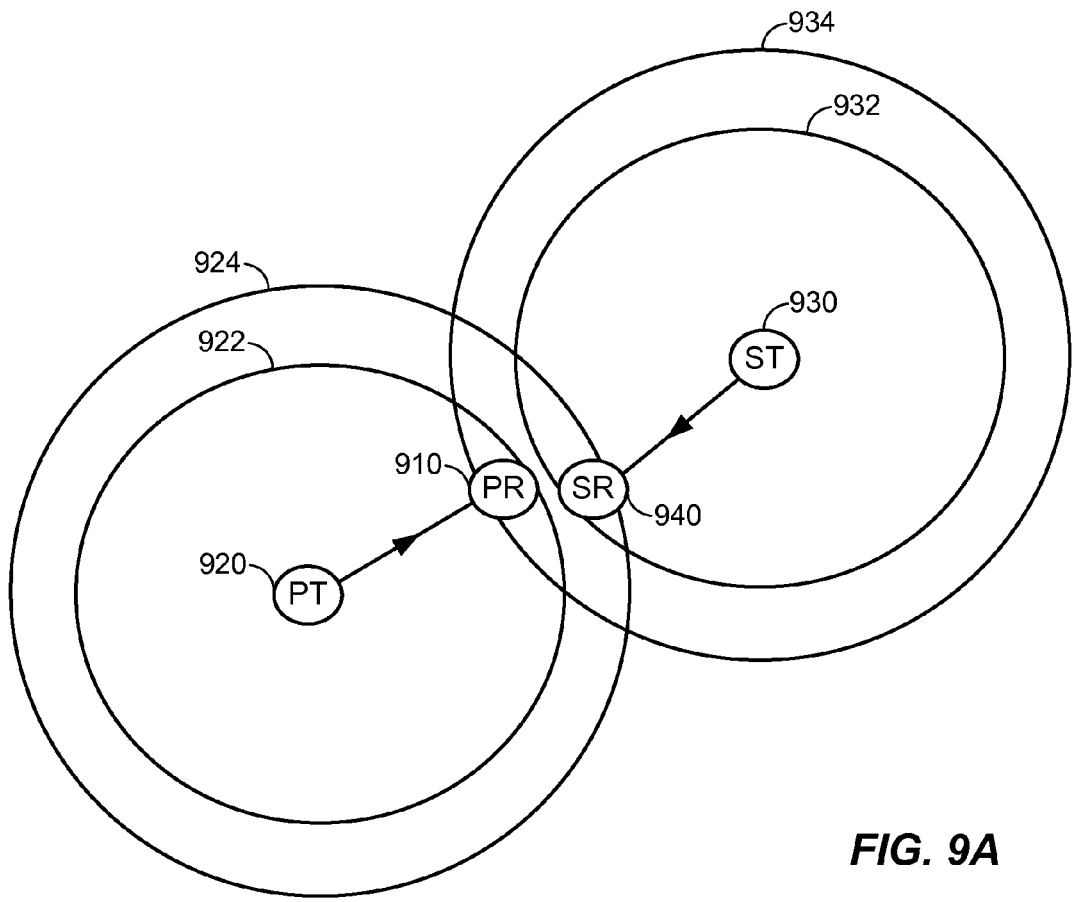
FIGS. 9A and 9B illustrate example scenarios where a beacon transmission range may limit spatial reuse.
Figure 9B:
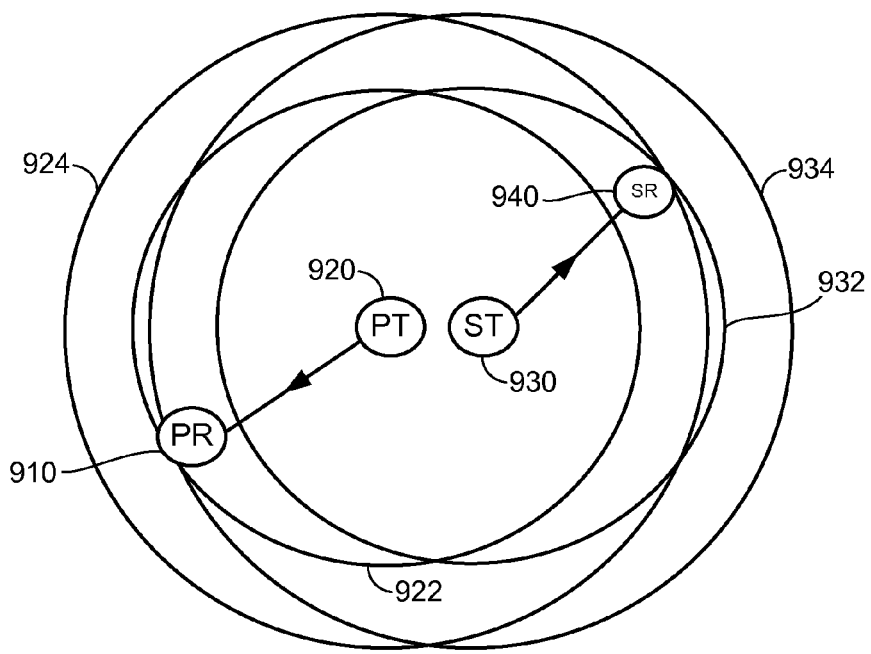

FIGS. 9A and 9B illustrate example scenarios where a beacon transmission range may limit spatial reuse. Here, a primary receiver (PR) 910 is within beacon range 922 of a primary transmitter (PT) 920. The PR 910 is also within interference range 934 of a secondary transmitter (ST) 930. A secondary receiver (SR) 940 is within beacon range 932 of the ST 930 and interference range 924 of the PT 920. The PR 910 cannot hear the ST's 930 beacons and its DRP Availability IEs as the PR 910 is outside the beacon range 932 of the ST 930. Similarly, the SR 940 cannot hear the PT's 920 beacons and its DRP Availability IEs as the SR 940 is outside the beacon range 922 of the PT 920. However, the PR 910 and the SR 940 can hear each other's beacons. Since both the PR 910 and the SR 940 advertise reserved MAS slots as available in their DRP Owner Availability IEs, they conclude that they are eligible for spatial reuse if both are reservation targets. However, as shown, the PT's 920 transmission to the PR 910 causes interference at the SR 940, while the ST's 930 transmission to the SR 940 causes interference at the PR 910.

Conventional ECMA-368 addresses this potential interference by limiting spatial reuse with two-hop clearing such that the problem is avoided altogether. In doing so, however, transmission opportunities are wasted as discussed in more detail above. Under the more aggressive spatial reuse techniques described herein, secondary transmissions may be selectively disabled to avoid potential interference as needed. Selective disabling schemes can be proactive or reactive, or a combination of both. Proactive schemes for disabling secondary transmission may be used for primary flows with bi-directional traffic, primary flows using private DRP reservation, primary flows with high QoS requirements, and/or primary flows having a low link margin resulting in lower data rates. Reactive schemes may be based on interference measurements (e.g., a Signal to Interference-plus-Noise Ratio (SINR)) for intended and other concurrent transmissions. These schemes are sufficient as both the primary and secondary transmitters/receivers are aware of the presence of secondary/primary flows. In those cases where a secondary transmission is causing interference to a primary transmission or vice versa, spatial reuse may revert back to the conventional ECMA-368 mode and the secondary transmission will be disabled. Thus, spatial reuse will be no worse than ECMA-368 in these cases, but in other cases, spatial reuse is enhanced.

Another aspect of spatial reuse enhancement, the use of directional antennas and accompanying changes in ECMA-368 to support directional transmission/reception, is described below. Here, some or all of the nodes are configured to support directional transmission and reception, which increases spatial reuse. As will be described in more detail below, the superframe structure is modified to allow for antenna training and new IEs are provided in the corresponding beacon frames to indicate the directional antenna capabilities of each device.

Figure 10:
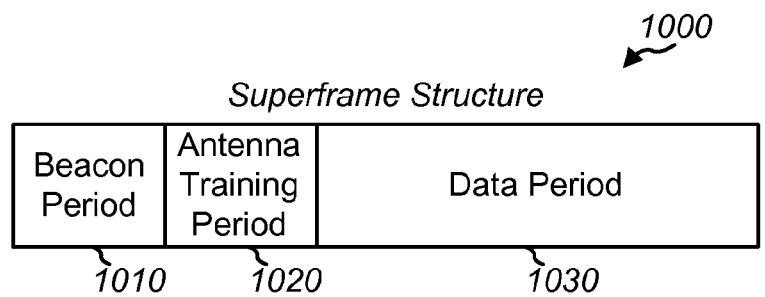
FIG. 10 illustrates a modified superframe structure according to an example embodiment.

FIG. 10 illustrates a modified superframe structure according to one embodiment. As shown, the superframe structure 1000 includes a beacon period 1010, an antenna training period 1020, and a data period 1030. The beacon period 1010 is the standard period of time during which devices send or listen for beacon frames, and the data period 1030 is the subsequent period of time during which the devices send or receive data. Here, beacon transmission and reception during the beacon period 1010 is omni-directional, whereas the data transmission and reception during the data period 1030 uses directional transmissions when supported. It is noted that while omni-directional beaconing and directional transmission have been used in centralized MAC protocols (e.g., IEEE 802.11), they have not heretofore been successfully applied to distributed MAC protocols (e.g., ECMA-368, WiMedia, etc.). In general, devices send only one beacon to all neighbors in one beacon frame. The antenna training period 1020 is selectively provided, when needed, as a period of time during which the devices can coordinate their directional antenna configurations for use in the subsequent data period 1030. During the antenna training period 1020, channel access is contention based. Neighbor discovery, synchronization, and antenna training each use the same channel medium as the data channel.

Figure 11:
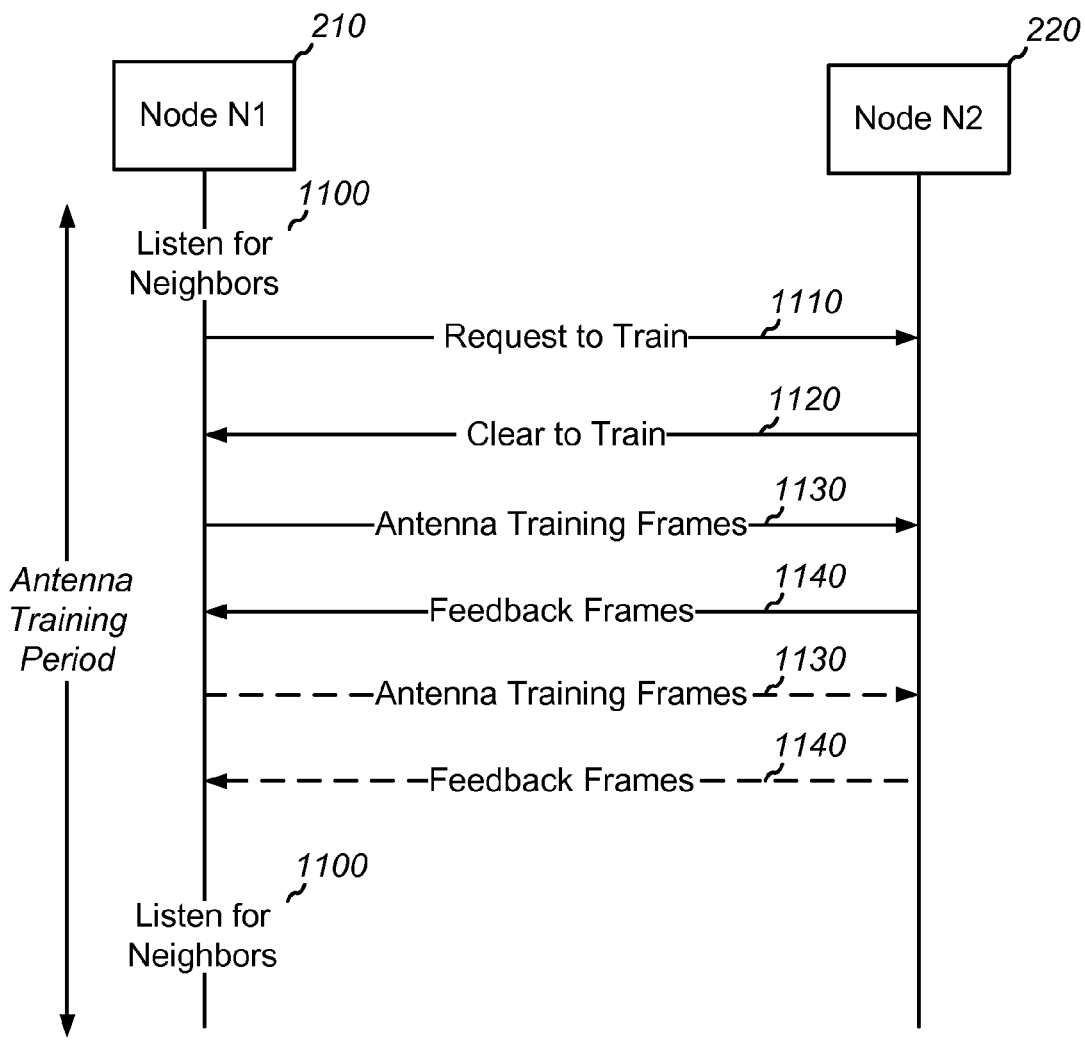
FIG. 11 is a signaling diagram illustrating antenna training procedures according to an example embodiment.

FIG. 11 is a signaling diagram illustrating antenna training procedures according to an example embodiment. With reference back to the wireless ad-hoc network 200 of FIG. 2, a device capable of supporting directional transmission (e.g., the first node 210) attempts to discover neighbors (e.g., the second node 220) that also support directional transmission 1100. Nodes that can hear each other attempt to form pair wise connections to directionally train on their antennas. Once the second node 220, for example, has been detected, the first node 210 uses Carrier Sense Multiple Access with Collision Avoidance (CSMA/CA) to access the channel medium during the antenna training period 1020 and send Request to Train (RTT) packets 1110 to the second node 220. The second node 220 responds by sending Clear to Train (CTT) packets 1120. The RTT and CTT packets 1110, 1120 are sent omni-directionally and indicate the time duration of the antenna training frame transaction so that other devices do not access the channel medium during that time.

Following the RTT and CTT frames 1110, 1120, the first node 210 sends antenna training frames 1130 with training sequences to the second node 220 according to negotiated parameters. The second node 220 responds with feedback frames 1140 including an Antenna Feedback IE (AFIE). The antenna training and feedback frames 1130, 1140 may be exchanged multiple times as needed. Coarse sector selection and finer antenna index selection (if supported) are performed during this phase. The PHY rate used for antenna training and feedback packets is same as the PHY rate for beaconing, i.e. 53.3 Mbps.

In one embodiment, the antenna training is performed with all neighbors to achieve maximum spatial reuse. However, this approach is resource intensive. In another embodiment, antenna training is performed with only those neighbors with which a node intends to later communicate. In this embodiment, antenna training is performed reactively as opposed to proactively in the sense that if there are other MAS slots available satisfying the desired Quality of Service (QoS) requirements, the MAS slots that are already being used by other neighbors are left alone. Only if the same MAS slots are required for meeting QoS requirements is the node forced to detect the orientation of the other neighbors (with which the node might not have any data exchange) to determine if simultaneous transmission is allowable.

The antenna training period 1020 length can be made long enough such that all nodes supporting directional transmission are able to perform antenna training in one superframe 1000. However, it is generally desirable to keep the overhead of antenna training proportional to the number of nodes in the Beacon Group that support directional antennas. A device's Beacon Group is the set of other devices from which beacons are received that identify the same beacon period start time (BPST) as the device. Accordingly, in one embodiment, the antenna training period 1020 is made a function of the number of nodes that support directional transmission. Accordingly, the antenna training period 1020 is free to shrink and grow (like the beacon period 1010) up to a maximum Antenna Training Period Length (mMaxATPLength). In this embodiment, the start of the data period 1030 is shifted if either the beacon period 1010 or the antenna training period 1020, or both, changes.

Alternatively, the antenna training period 1020 may be of a shorter length such that antenna training is performed over multiple superframes 1000 for different pairs of nodes. This approach helps limit overhead. In one embodiment, the antenna training period 1020 is fixed as a small number of MASs such that only one pair of nodes performs antenna training in one superframe 1000. The other nodes perform antenna training over subsequent superframes 1000.

A device is not permitted to start transmission of a frame on the channel medium earlier than a defined Inter Frame spacing (IFS) duration after the end of a frame it transmitted previously on the medium or after the end of a previously received frame on the medium. Two different IFSs can be used during the antenna training period. A shorter IFS (e.g., short inter-frame space (SIFS)) can be used by devices that want to perform both antenna training and data communication after antenna training, while a longer IFS can be used by devices that want to perform antenna training but do not need to immediately support any flow between them. This provides priority to the devices that are going to exchange data over the next few superframes. Devices that performed antenna training in the last mMaxATSuperframes superframes do not contend for channel access during the antenna training period 1020. At the end of mMaxATSuperframes superframes after the most recent antenna training, these nodes may use either of the two IFSs described above.

Each device generates an indication of antenna training between itself and a particular neighbor once every mMaxATSuperframes superframes, if needed. When such an indication is generated, the device contends for channel access during the antenna training period 1020. The behavior of contending for access during the antenna training period 1020 may be governed by well known back-off procedures or p-persistent strategies (e.g., those in CSMA/CA). If no nodes want to perform antenna training during the antenna training period 1020, the antenna training period 1020 can instead be claimed by a device for Prioritized Contention Access (PCA) operation. The IFS for PCA operation (i.e., arbitration inter-frame space (AIFS) in ECMA-368) is larger than both the antenna training IFSs described above. Further, DRP operation is disallowed in the antenna training period 1020. DRP reservations are either made during the beacon period 1010 or during the data period 1030.

Once antenna training is completed, antenna index information for DRP reservations between nodes that support directional transmission is broadcast via DRP Reservation IEs. In one embodiment, the capability of supporting directional antennas is conveyed in one or more new IEs of the beacon frames. In another embodiment, the DRP Reservation IE 500 of FIG. 5 is modified to include this information, such as in one of the reserved bits b15-b13 in the Reserved field 560. Some of the capabilities that are conveyed include, but are not limited to, the number of TX antenna elements, a trainable TX phased array antenna support indicator, the number of RX antenna elements, a trainable RX phased array antenna support indicator, and support for antenna feedback.

The techniques presented above are advantageous even in the presence legacy devices that do not support directional antennas. If either of the two nodes that intend to communicate does not support directional transmission, it will not indicate any antenna index. If either of the two nodes that intend to communicate does not support directional transmission, then there is no advantage with respect to conventional ECMA-368 spatial reuse. Where no node in a Beacon Group supports directional transmissions, however, the data period 1030 can start immediately after the beacon period 1010 and no overhead is dedicated for antenna training.

In other embodiments, antenna training may occur outside the designated antenna training period 1020, such as during the data period 1030, either using DRP reservations or a PCA regime. In the DRP reservation, for example, two devices may perform antenna training by exchanging RTT, CTT, training and feedback frames. Further, it will be appreciated that the antenna training period 1020 need not be located immediately after the beacon period 1010 and before the data period 1030. It can be located anywhere else in the superframe 1000, if desired, and may be merged with the aforementioned PCA regime. Moving the location of the antenna training does not prevent different IFSs from still being used for the antenna training.

Although not shown in FIG. 10, the superframe 1000 is split into 16 allocation zones numbered from 0 to 15 starting from the BPST. Each zone contains 16 consecutive MAS slots, which are numbered from 0 to 15 within the zone. Flexibility in locating the antenna training period 1020 is advantageous because putting the antenna training period 1020 immediately after the beacon period 1010 in some cases may require a significant number of MAS slots from Allocation Zone 0, and potentially Allocation Zone 1, to accommodate both the beacon period 1010 and the antenna training period 1020. Hence, it might not be possible to accommodate DRP reservations that require tight latency bounds (e.g., MAS requirements in every other allocation zone). By setting the start of the antenna training period 1020 at some allocation zone and MAS index, there is no need for devices to indicate start of the allocation training period 1020.

It is noted that ECMA-387 MAC also supports directional transmission and reception. However, there are important differences between the embodiments described herein and ECMA-387. For example, in ECMA-387, devices send directional beacons to different neighbors in multiple beacon slots, instead of sending only one beacon to all neighbors in one omni-directional beacon slot. Also, neighbor discovery, synchronization, and antenna training typically occur in a different channel than the data channel in ECMA-387 systems. Accordingly, the embodiments described herein provide alternatives and advantages over those of ECMA-387 MAC.

Figure 1:
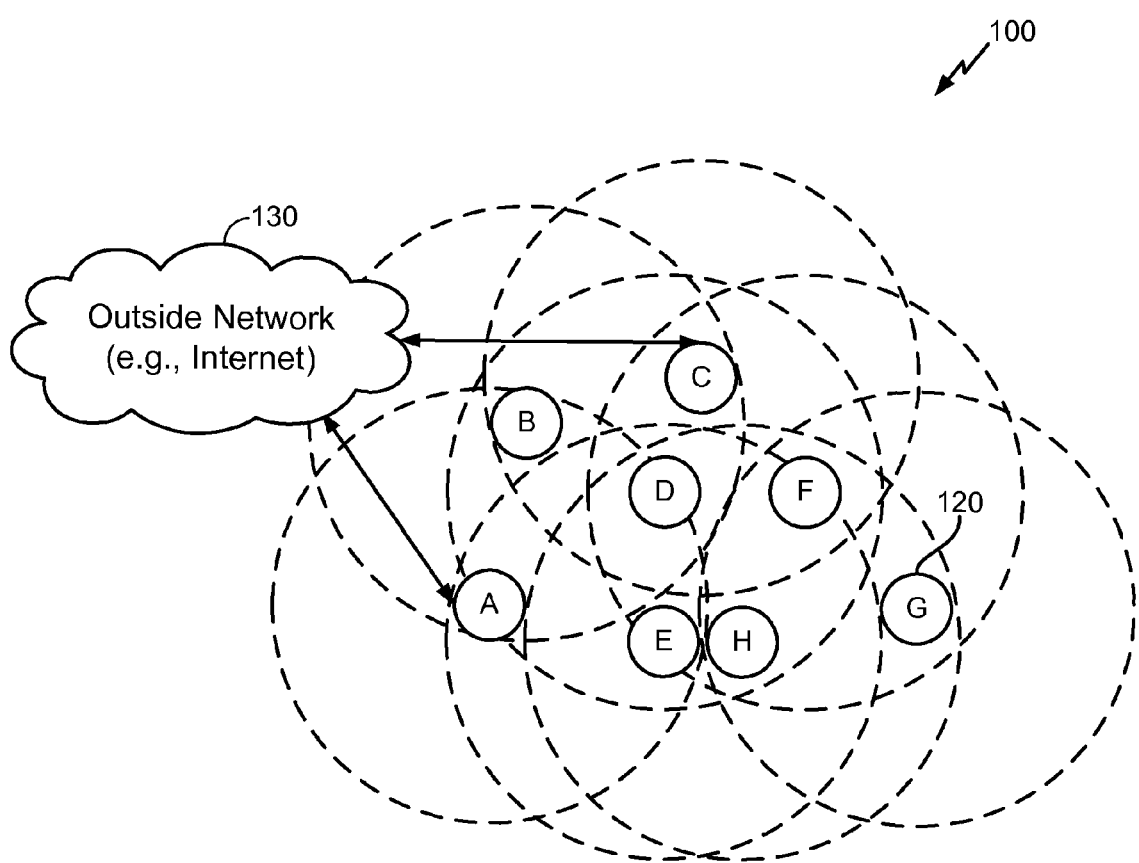
FIG. 1 illustrates a first wireless ad-hoc network formed by a plurality of nodes.
Figure 12:
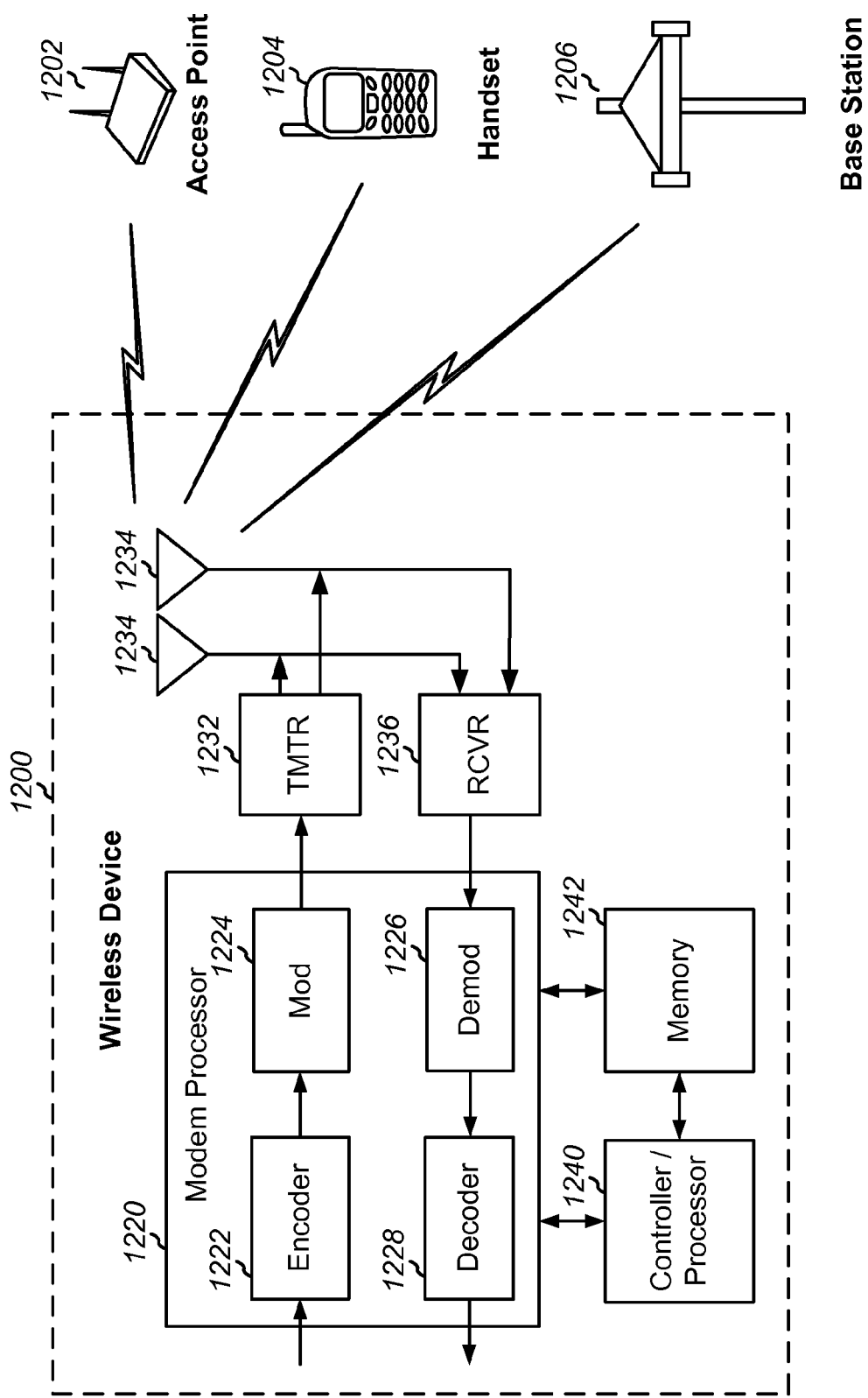
FIG. 12 illustrates an example wireless device for operation in a wireless ad-hoc network.

FIG. 12 illustrates an example wireless device for operation in a wireless ad-hoc network, such as those of FIGS. 1, 2, and 8 described above. As shown, the wireless device 1200 is capable of communicating peer-to-peer with other wireless devices such as a handset 1204, and may also be capable of communicating with outside networks via an access point 1202 and/or a base station 1206. On the transmit path, traffic data to be sent by wireless device 1200 is processed (e.g., formatted, encoded, and interleaved) by an encoder 1222 and further processed (e.g., modulated, channelized, and scrambled) by a modulator (Mod) 1224 in accordance with an applicable radio technology (e.g., for Wi-Fi or WWAN) to generate output chips. A transmitter (TMTR) 1232 then conditions (e.g., converts to analog, filters, amplifies, and upconverts) the output chips and generates a modulated signal, which is transmitted via one or more antennas 1234.

On the receive path, antenna 1234 receives signals transmitted by other wireless devices 1204, the base station 1206 in a WWAN, and/or the access point 1202 in a WLAN. A receiver (RCVR) 1236 conditions (e.g., filters, amplifies, downconverts, and digitizes) a received signal from the one or more antennas 1234 and provides samples. A demodulator (Demod) 1226 processes (e.g., descrambles, channelizes, and demodulates) the samples and provides symbol estimates. A decoder 1228 further processes (e.g., deinterleaves and decodes) the symbol estimates and provides decoded data. Encoder 1222, modulator 1224, demodulator 1226, and decoder 1228 may be implemented by a modem processor 1220. These units perform processing in accordance with the radio technology or technologies used for communication.

A controller/processor 1240 controls the operation of wireless device 1200. A memory 1242 store data and program codes for wireless device 1200. Controller/processor 1240 may implement one or more of the processes/techniques described herein, including those of FIGS. 6, 7, and 11, including the generation of any of the beacon frames, IEs, data frames, etc., used therein. Memory 1242 may store various types of information such as the reservation and availability information of FIGS. 3, 4, 5, and 9.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for facilitating communication in a wireless ad-hoc network. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of facilitating communication in a wireless ad-hoc network, the method comprising:

generating, at a node in the wireless ad-hoc network, target availability information with regard to one or more transmission slots, the target availability information indicating whether the node is permitted to receive a transmission during each transmission slot;

generating, at the node, owner availability information with regard to one or more transmission slots, the owner availability information indicating whether the node is permitted to transmit during each transmission slot; and broadcasting, from the node, both the target availability information and the owner availability information together to separately indicate availability as either an owner or a target for one or more transmission slots.

2. The method of claim 1, wherein the target availability information and the owner availability information are different and identify at least one transmission slot during which the node is permitted to transmit but not receive a transmission, or to receive a transmission but not transmit.

3. The method of claim 1, wherein the node is permitted to transmit or receive a transmission in a given transmission slot if the transmission slot is not reserved by neighboring nodes.

4. The method of claim 1, wherein the wireless ad-hoc network uses a Distributed Reservation Protocol (DRP) and indicates network information via Information Elements (IEs) in one or more beacon signals.

5. The method of claim 4, wherein broadcasting comprises broadcasting a beacon frame, the beacon frame comprising a DRP Target Availability IE indicating the target availability information and a DRP Owner Availability IE indicating the owner availability information.

6. The method of claim 4, wherein broadcasting comprises broadcasting a beacon frame, the beacon frame comprising a DRP Availability IE indicating combined target and owner availability information, and a DRP Supplemental IE indicating one of the target availability information and the owner availability information.

7. The method of claim 4, wherein broadcasting comprises broadcasting a beacon frame, the beacon frame comprising a DRP Availability IE indicating combined target and owner availability information, and also indicating one of the target availability information and the owner availability information.

8. The method of claim 4, wherein broadcasting comprises broadcasting a beacon frame, the beacon frame comprising a modified DRP Availability IE indicating the target availability information and the owner availability information.

9. The method of claim 1, further comprising: broadcasting reservation information identifying one or more transmission slots as reserved.

10. The method of claim 1, further comprising:
receiving, at the node, reservation information from one or more neighboring nodes, the reservation information identifying one or more transmission slots as reserved,
wherein generating the target availability information and generating the owner availability information is based on the received reservation information.

11. The method of claim 10, further comprising:
identifying the source of the received reservation information as either a corresponding target or a corresponding owner of each identified reserved transmission slot,
wherein generating the target availability information comprises indicating availability as a target for a given transmission slot if the transmission slot is identified as reserved by a target and not reserved by an owner, and
wherein generating the owner availability information comprises indicating availability as an owner for a given transmission slot if the transmission slot is identified as reserved by an owner and not reserved by a target.

12. The method of claim 1, further comprising: receiving, at the node, availability information from one or more neighboring nodes; and
refraining from scheduling transmissions with the one or more neighboring nodes in a time period designated for reverse traffic unless the received availability information indicates availability as both target and owner.

13. The method of claim 1, further comprising:
identifying, at the node, at least one neighboring node that supports directional transmission;
exchanging request to train and clear to train packets with the neighboring node to initiate directional antenna training of a plurality of directional antennas;
exchanging antenna training and feedback frames with the neighboring node to train the plurality of directional antennas; and
transmitting at least one data packet to the neighboring node via the trained plurality of directional antennas.

14. The method of claim 13, wherein exchanging the request to train and clear to train packets is performed via omni-directional transmission, and exchanging the antenna training and feedback frames is performed via directional transmission.

15. The method of claim 13, further comprising: broadcasting, from the node, antenna index information corresponding to the trained plurality of directional antennas.

16. A wireless communication device for communicating as a node in a wireless ad-hoc network, the wireless communication device comprising:
logic to generate target availability information for the node with regard to one or more transmission slots, the target availability information indicating whether the node is permitted to receive a transmission during each transmission slot;
logic to generate owner availability information of the node with regard to one or more transmission slots, the owner availability information indicating whether the node is permitted to transmit during each transmission slot; and
logic to broadcast, from the node, both the target availability information and the owner availability information together to separately indicate availability as either an owner or a target for one or more transmission slots.

17. The wireless communication device of claim 16, wherein the target availability information and the owner availability information are different and identify at least one transmission slot during which the node is permitted to transmit but not receive a transmission, or to receive a transmission but not transmit.

18. The wireless communication device of claim 16, wherein the wireless ad-hoc network uses a Distributed Reservation Protocol (DRP) and indicates network information via Information Elements (IEs) in one or more beacon signals, the logic to broadcast comprising logic to broadcast a beacon frame, the beacon frame comprising a DRP Target Availability IE indicating the target availability information and a DRP Owner Availability IE indicating the owner availability information.

19. The wireless communication device of claim 16, further comprising:
logic to receive, at the node, reservation information from one or more neighboring nodes, the reservation information identifying one or more transmission slots as reserved,
wherein generating the target availability information and generating the owner availability information is based on the received reservation information.

20. The wireless communication device of claim 16, further comprising:
logic to receive, at the node, availability information from one or more neighboring nodes; and logic to refrain from scheduling transmissions with the one or more neighboring nodes in a time period designated for reverse traffic unless the received availability information indicates availability as both target and owner.

21. The wireless communication device of claim 16, further comprising:
   logic to identify, at the node, at least one neighboring node that supports directional transmission;
   logic to exchange request to train and clear to train packets with the neighboring node to initiate directional antenna training of a plurality of directional antennas;
   logic to exchange antenna training and feedback frames with the neighboring node to train the plurality of directional antennas; and
   logic to transmit at least one data packet to the neighboring node via the trained plurality of directional antennas.

22. A wireless communication device for communicating as a node in a wireless ad-hoc network, the wireless communication device comprising:
   means for generating target availability information for the node with regard to one or more transmission slots, the target availability information indicating whether the node is permitted to receive a transmission during each transmission slot;
   means for generating owner availability information of the node with regard to one or more transmission slots, the owner availability information indicating whether the node is permitted to transmit during each transmission slot; and
   means for broadcasting, from the node, both the target availability information and the owner availability information together to separately indicate availability as either an owner or a target for one or more transmission slots.

23. The wireless communication device of claim 22, wherein the target availability information and the owner availability information are different and identify at least one transmission slot during which the node is permitted to transmit but not receive a transmission, or to receive a transmission but not transmit.

24. The wireless communication device of claim 22, wherein the wireless ad-hoc network uses a Distributed Reservation Protocol (DRP) and indicates network information via Information Elements (IEs) in one or more beacon signals, the means for broadcasting comprising means for broadcasting a beacon frame, the beacon frame comprising a DRP Target Availability IE indicating the target availability information and a DRP Owner Availability IE indicating the owner availability information.

25. The wireless communication device of claim 22, further comprising:
   means for receiving, at the node, reservation information from one or more neighboring nodes, the reservation information identifying one or more transmission slots as reserved,
   wherein generating the target availability information and generating the owner availability information is based on the received reservation information.

26. The wireless communication device of claim 22, further comprising:
   means for receiving, at the node, availability information from one or more neighboring nodes; and
   means for refraining from scheduling transmissions with the one or more neighboring nodes in a time period designated for reverse traffic unless the received availability information indicates availability as both target and owner.

27. The wireless communication device of claim 22, further comprising:
   means for identifying, at the node, at least one neighboring node that supports directional transmission;
   means for exchanging request to train and clear to train packets with the neighboring node to initiate directional antenna training of a plurality of directional antennas;
   means for exchanging antenna training and feedback frames with the neighboring node to train the plurality of directional antennas; and
   means for transmitting at least one data packet to the neighboring node via the trained plurality of directional antennas.

28. A non-transitory computer-readable storage medium comprising code, which, when executed by a processor, causes the processor to perform operations for facilitating wireless communication as a node in a wireless ad-hoc network, the computer-readable storage medium comprising:
   code for generating target availability information for the node with regard to one or more transmission slots, the target availability information indicating whether the node is permitted to receive a transmission during each transmission slot;
   code for generating owner availability information of the node with regard to one or more transmission slots, the owner availability information indicating whether the node is permitted to transmit during each transmission slot; and
   code for broadcasting, from the node, both the target availability information and the owner availability information together to separately indicate availability as either an owner or a target for one or more transmission slots.

29. The non-transitory computer-readable storage medium of claim 28, wherein the target availability information and the owner availability information are different and identify at least one transmission slot during which the node is permitted to transmit but not receive a transmission, or to receive a transmission but not transmit.

30. The non-transitory computer-readable storage medium of claim 28, wherein the wireless ad-hoc network uses a Distributed Reservation Protocol (DRP) and indicates network information via Information Elements (IEs) in one or more beacon signals, the code for broadcasting comprising code for broadcasting a beacon frame, the beacon frame comprising a DRP Target Availability IE indicating the target availability information and a DRP Owner Availability IE indicating the owner availability information.

31. The non-transitory computer-readable storage medium of claim 28, further comprising:
   code for receiving, at the node, reservation information from one or more neighboring nodes, the reservation information identifying one or more transmission slots as reserved,
   wherein generating the target availability information and generating the owner availability information is based on the received reservation information.

32. The non-transitory computer-readable storage medium of claim 28, further comprising:
   code for receiving, at the node, availability information from one or more neighboring nodes; and
   code for refraining from scheduling transmissions with the one or more neighboring nodes in a time period designated for reverse traffic unless the received availability information indicates availability as both target and owner.

33. The non-transitory computer-readable storage medium of claim 28, further comprising:
  code for identifying, at the node, at least one neighboring node that supports directional transmission;
  code for exchanging request to train and clear to train packets with the neighboring node to initiate directional antenna training of a plurality of directional antennas;
  code for exchanging antenna training and feedback frames with the neighboring node to train the plurality of directional antennas; and
  code for transmitting at least one data packet to the neighboring node via the trained plurality of directional antennas.

34. A method of facilitating communication in a wireless ad-hoc network, the method comprising:
  identifying, at the node, at least one neighboring node that supports directional transmission;
  exchanging request to train and clear to train packets with the neighboring node via omni-directional transmission to initiate directional antenna training of a plurality of directional antennas;
  exchanging antenna training and feedback frames with the neighboring node via directional transmission to train the plurality of directional antennas; and
  transmitting at least one data packet to the neighboring node via the trained plurality of directional antennas,
  wherein the identifying the at least one neighboring node, the exchanging the request to train and clear packets, the exchanging the antenna training and feedback frames, and the transmitting the at least one data packet each use the same channel medium as a data channel.

35. The method of claim 34, wherein the wireless ad-hoc network uses a distributed Media Access Control (MAC) protocol.

36. The method of claim 34, further comprising: broadcasting, from the node, antenna index information corresponding to the trained plurality of directional antennas.

37. The method of claim 34, wherein communication proceeds according to a superframe structure divided into at least a beacon period, an antenna training period, and a data period, the identifying at least one neighboring node, the exchanging request to train and clear to train packets, and the exchanging antenna training and feedback frames being performed during the antenna training period, and the transmitting at least one data packet being performed during the data period.

38. The method of claim 34, wherein communication proceeds according to a superframe structure divided into at least a beacon period and a data period, the identifying at least one neighboring node, the exchanging request to train and clear to train packets, and the exchanging antenna training and feedback frames, and the transmitting at least one data packet being performed during the data period.

39. A wireless communication device for communicating as a node in a wireless ad-hoc network, the wireless communication device comprising:
  logic to identify, at the node, at least one neighboring node that supports directional transmission;
  logic to exchange request to train and clear to train packets with the neighboring node via omni-directional transmission to initiate directional antenna training of a plurality of directional antennas;
  logic to exchange antenna training and feedback frames with the neighboring node via directional transmission to train the plurality of directional antennas; and
  logic to transmit at least one data packet to the neighboring node via the trained plurality of directional antennas,
  wherein the logic to identify the at least one neighboring node, the logic to exchange the request to train and clear packets, the logic to exchange the antenna training and feedback frames, and the logic to transmit the at least one data packet each use the same channel medium as a data channel.

40. The wireless communication device of claim 39, wherein communication proceeds according to a superframe structure divided into at least a beacon period, an antenna training period, and a data period, the logic to identify at least one neighboring node, the logic to exchange request to train and clear to train packets, and the logic to exchange antenna training and feedback frames operating during the antenna training period, and the logic to transmit at least one data packet operating during the data period.

41. A wireless communication device for communicating as a node in a wireless ad-hoc network, the wireless communication device comprising:
  means for identifying, at the node, at least one neighboring node that supports directional transmission;
  means for exchanging request to train and clear to train packets with the neighboring node via omni-directional transmission to initiate directional antenna training of a plurality of directional antennas;
  means for exchanging antenna training and feedback frames with the neighboring node via directional transmission to train the plurality of directional antennas; and
  means for transmitting at least one data packet to the neighboring node via the trained plurality of directional antennas,
  wherein the means for identifying the at least one neighboring node, the means for exchanging the request to train and clear packets, the means for exchanging the antenna training and feedback frames, and the means for transmitting the at least one data packet each use the same channel medium as a data channel.

42. The wireless communication device of claim 41, wherein communication proceeds according to a superframe structure divided into at least a beacon period, an antenna training period, and a data period, the means for identifying at least one neighboring node, the means for exchanging request to train and clear to train packets, and the means for exchanging antenna training and feedback frames operating during the antenna training period, and the means for transmitting at least one data packet operating during the data period.

43. A non-transitory computer-readable storage medium comprising code, which, when executed by a processor, causes the processor to perform operations for facilitating wireless communication as a node in a wireless ad-hoc network, the computer-readable storage medium comprising:
  code for identifying, at the node, at least one neighboring node that supports directional transmission;
  code for exchanging request to train and clear to train packets with the neighboring node via omni-directional transmission to initiate directional antenna training of a plurality of directional antennas;
  code for exchanging antenna training and feedback frames with the neighboring node via directional transmission to train the plurality of directional antennas; and
  code for transmitting at least one data packet to the neighboring node via the trained plurality of directional antennas,
  wherein the code for identifying the at least one neighboring node, the code for exchanging the request to train and clear packets, the code for exchanging the antenna training and feedback frames, and the code for transmitting the at least one data packet each use the same channel medium as a data channel.

44. The non-transitory computer-readable storage medium of claim 43, wherein communication proceeds according to a superframe structure divided into at least a beacon period, an antenna training period, and a data period, the identifying at least one neighboring node, the exchanging request to train and clear to train packets, and the exchanging antenna training and feedback frames being performed during the antenna training period, and the code for transmitting at least one data packet being performed during the data period.

\* \* \* \* \*